US012704114B2

(12) United States Patent
Hogg

(10) Patent No.: US 12,704,114 B2
(45) Date of Patent: Aug. 11, 2026

(54) APPARATUS AND METHODS FOR PRODUCING ELECTRICITY USING GEOTHERMAL ENERGY

(71) Applicant: GEOGEN TECHNOLOGIES INC., Calgary (CA)

(72) Inventor: Matthew Hogg, Calgary (CA)

(73) Assignee: GEOGEN TECHNOLOGIES INC., Calgary (CA)

( * ) Notice: Subject to any disclaimer, the term of this patent is extended or adjusted under 35 U.S.C. 154(b) by 0 days.

(21) Appl. No.: 18/284,041

(22) PCT Filed: Mar. 25, 2022

(86) PCT No.: PCT/CA2022/050454
§ 371 (c)(1),
(2) Date: Sep. 25, 2023

(87) PCT Pub. No.: WO2022/198336
PCT Pub. Date: Sep. 29, 2022

(65) Prior Publication Data

US 2024/0167461 A1 May 23, 2024

Related U.S. Application Data

(60) Provisional application No. 63/166,440, filed on Mar. 26, 2021.

(51) Int. Cl.
*F03G 4/00* (2006.01)
*F03G 4/02* (2006.01)
(Continued)

(52) U.S. Cl.
CPC ............... *F03G 4/029* (2021.08); *F03G 4/02* (2021.08); *F03G 4/04* (2021.08); *F24T 10/17* (2018.05); *F24T 50/00* (2018.05)

(58) Field of Classification Search
CPC ....................................................... F03G 4/029
See application file for complete search history.

(56) References Cited

U.S. PATENT DOCUMENTS 5,839,508 A * 11/1998 Tubel .................. E21B 41/0085
166/66.5
6,259,165 B1 * 7/2001 Brewington ............ F03G 4/074
290/1 A (Continued)

FOREIGN PATENT DOCUMENTS

CA 2865736 A1 * 3/2016
WO 2013059701 A1 4/2013
WO 2018216238 A1 11/2018

OTHER PUBLICATIONS

Bourasseau et al., Thermodynamic Behavior of the CO2 + NO2/N2O4 Mixture: A Monte Carlo Simulation Study, J. Phys. Chem. B, vol. 112, No. 49, 2008.

(Continued)

*Primary Examiner* — Jonathan R Matthias
(74) *Attorney, Agent, or Firm* — Bennett Jones LLP

(57) ABSTRACT

A geothermal power system is disclosed. The system comprises a downhole turbine configured to operate within a wellbore and a downhole electrical generator configured to be driven by the turbine. A channel facilitates flow of a working fluid through the turbine. The channel has a feed portion allowing the working fluid to flow in a direction away from the surface and a return portion allowing the working fluid to flow in a direction towards the surface. A surface structure is in fluid communication with the feed portion and the return portion to circulate the working fluid through the channel.

14 Claims, 30 Drawing Sheets

(51) Int. Cl.

| | |
|---|---|
| ***F03G 4/04*** | (2006.01) |
| ***F24T 10/17*** | (2018.01) |
| ***F24T 50/00*** | (2018.01) |

(56) References Cited

U.S. PATENT DOCUMENTS

| | | | | |
|---|---|---|---|---|
| 8,281,591 | B2 | 10/2012 | Lakic | |
| 8,610,303 | B2 * | 12/2013 | Yocum, Jr. | F03B 13/02 290/43 |
| 8,708,046 | B2 | 4/2014 | Montgomery et al. | |
| 8,713,940 | B2 | 5/2014 | Lakic | |
| 8,991,510 | B2 | 3/2015 | Saar et al. | |
| 9,978,466 | B2 * | 5/2018 | Lakic | G21D 1/02 |
| 10,626,709 | B2 | 4/2020 | Al-Dossary | |
| 2003/0131986 | A1 * | 7/2003 | Schultz | H02K 7/1823 166/66.5 |
| 2012/0091711 | A1 * | 4/2012 | Badger | F03B 13/02 290/43 |
| 2014/0354081 | A1 * | 12/2014 | Li | E21B 41/0085 166/53 |
| 2015/0121868 | A1 | 5/2015 | Fryrear et al. | |
| 2015/0330670 | A1 * | 11/2015 | Wynn, Jr. | F24T 10/00 165/45 |
| 2017/0362953 | A1 * | 12/2017 | Gatzen | E21B 41/0085 |
| 2018/0149133 | A1 * | 5/2018 | Herl | F03B 13/02 |
| 2018/0355703 | A1 * | 12/2018 | Al-Dossary | F01D 15/10 |
| 2019/0154010 | A1 | 5/2019 | Toews | |
| 2020/0270496 | A1 | 8/2020 | Bonalumi et al. | |
| 2020/0309101 | A1 | 10/2020 | Muir et al. | |
| 2021/0062682 | A1 | 3/2021 | Higgins et al. | |
| 2022/0059747 | A1 * | 2/2022 | Weir | F03G 4/035 |
| 2023/0101657 | A1 * | 3/2023 | Madison | F03B 13/06 290/54 |

OTHER PUBLICATIONS

Shi et al., Performance analysis of medium-depth coaxial heat exchanger geothermal system using CO2 as a circulating fluid for building heating, Arabian Journal of Geosciences (2021) 14: 1308.

Sun et al., Performance of geothermal energy extraction in a horizontal well by using CO2 as the working fluid, Energy Conversion and Management, 171 (2018), 1529-1539.

Zhang et al., Identification of heat transfer intensification mechanism by reversible N2O4 decomposition using direct numerical simulation, International Journal of Heat and Mass Transfer, 182 (2022), 121946.

* cited by examiner

APPARATUS AND METHODS FOR PRODUCING ELECTRICITY USING GEOTHERMAL ENERGY

RELATED APPLICATIONS

This application is a 371 of PCT Application No. PCT/CA2022/050454 filed on Mar. 25, 2022, which claims priority from U.S. Patent Application No. 63/166,440 filed on Mar. 26, 2021 entitled "APPARATUS AND METHODS FOR PRODUCING ELECTRICITY FROM GEOTHERMAL ENERGY". For the purposes of the United States, this application claims the benefit under 35 U.S.C. § 119 of U.S. Patent Application No. 63/166,440 filed on Mar. 26, 2021 entitled "APPARATUS AND METHODS FOR PRODUCING ELECTRICITY FROM GEOTHERMAL ENERGY". The entirety of the contents of the referenced applications are hereby incorporated by reference for all purposes.

TECHNICAL FIELD

The present disclosure relates generally to geothermal energy production, and in particular to geothermal energy production in hydraulically fractured oil and gas wells with a moderate temperature differential from surface conditions.

REFERENCE TO RELATED APPLICATION

This application claims priority from U.S. Patent Application No. 63/166,440 filed on Mar. 26, 2021 entitled "APPARATUS AND METHODS FOR PRODUCING ELECTRICITY FROM GEOTHERMAL ENERGY". For the purposes of the United States, this application claims the benefit under 35 U.S.C. § 119 of U.S. Patent Application No. 63/166,440 filed on Mar. 26, 2021 entitled "APPARATUS AND METHODS FOR PRODUCING ELECTRICITY FROM GEOTHERMAL ENERGY". U.S. Patent Application No. 63/166,440 is incorporated herein by reference in its entirety for all purposes.

BACKGROUND

Oil reservoirs are typically not considered good candidates for geothermal reservoirs because the hotter the formation, the more likely it contains only water as the oil and gas would have migrated away or, if it could not migrate, over heated and potentially converted to sour gas. Therefore, the geothermal gradients associated with typical oil and gas or shale reservoirs are much lower than conventional or typical geothermal reservoirs. Lower geothermal gradients mean that wells must be deeper to reach the same heat, and more energy must be used to pump or circulate that heat to surface. This is one of the main reasons many oil and gas wells are not suited for conversion to geothermal after the oil and gas has been exhausted. The other reason is typical tight oil and gas, or shale wells do not have adequate permeability to sustain the flow rates needs for conventional geothermal.

In addition, the diameter of typical oil and gas wells is designed for hydrocarbon flow rates and not heat flow rates. The small diameter typical of many oil and gas wells limits the flow rate to the extent that it is not economic to lift the fluid to surface to extract heat, as the amount of power generated will not cover the cost to lift the water.

Instead, after an oil and gas well has stopped producing, it is typically abandoned. The steel and any equipment or well components in the hole are not recovered, but are left in situ, and the well is filled with cement and cut off at the surface. In addition, there is a rising issue concerning end-of-life wells not being properly abandoned, which is a significant financial liability to governments and a significant risk to the environment and safety.

There remains a need for systems and methods for generating power using moderate to low temperature geothermal resources, such as depleted oil and gas wells. There remains a need for geothermal systems that can be retrofitted to a single moderate to low temperature well (i.e., same well for fluid injection and fluid return).

SUMMARY

One aspect of the invention provides a geothermal system for generating electric power from flow of a working fluid in a wellbore. The system includes a downhole coaxial channel, a turbine generator located in the channel, and a surface structure for providing the working fluid. The downhole channel has an inner passage, an outer passage, and a toe located between the inner passage and the outer passage to place the inner passage in fluid communication with the outer passage. The surface structure is in fluid communication with the inner passage and the outer passage for circulating the working fluid through the coaxial channel in a closed loop.

The downhole coaxial channel may comprise a feed portion facilitating flow of the working fluid in a direction away from surface and a return portion facilitating flow of the working fluid in a direction toward surface. The turbine generator may comprises a hydraulic turbine configured to be driven by the working fluid flowing down the feed portion due to gravitational potential energy of a column of the working fluid. The turbine generator may comprise a gas turbine configured to be driven by the working fluid flowing up the return portion due to thermal energy harvested from formation. The thermal energy harvested from formation may cause the working fluid to undergo a density change in the return portion to provide a thermosyphon within the closed loop.

In some embodiments, the feed portion is provided by the inner passage and the return portion is provided by the outer passage. In other embodiments, the feed portion is provided by the outer passage and the return portion is provided by the inner passage. The system may optionally include one or more crossovers located in the downhole coaxial channel. Each of the one or more crossovers may be configured for switching the feed portion and the return portion between the inner passage and the outer passage. For example, each of the one or more crossovers may comprise a first set of connectors fluidly connecting the inner passage to the outer passage in the feed portion and a second set of connectors fluidly connecting the inner passage to the outer passage in the return portion.

In some embodiments, the system includes a second turbine generator located within the closed loop at the surface structure. In some embodiments, the inner passage is defined by an inner wall. The inner wall may include a section made of a thermally conductive material to facilitate heat exchange between the inner passage and the outer passage. The inner wall may include a section made of a thermally insulating material to prevent heat exchange between the inner passage and the outer passage. In some embodiments, the downhole coaxial channel is defined by an outer wall. The outer wall may be made of a thermally conductive material to facilitate heat exchange between the outer passage and formation.

In some embodiments, the cross-sectional area of the inner passage is greater than the cross-sectional area of the outer passage. In other embodiments, the cross-sectional area of the outer passage is greater than the cross-sectional area of the inner passage.

In some embodiments, the working fluid is an organic fluid. The fluid may be in a liquid phase at surface temperature and pressure, and in a gas phase in the return portion at downhole temperature and pressure. For example, the fluid may be in a liquid phase at a particular liquid temperature between ~20° C. to +20° C. and a corresponding particular liquid pressure less than 5,000 kPa, and in a gas phase at a particular gas temperature less than 150° C. and a corresponding particular gas pressure greater than 4,000 kPa. The working fluid may comprise one or more of $CO_2$, $SO_2$, and $NH_3$. The working fluid may comprise up to 0.15 mole percent $C_2H_6$, $C_2H_4$, $C_2H_2$. The working fluid may comprise a mixture of $NO_2$, $N_2O$ and $N_2O_4$. The working fluid may comprise a refrigerant that undergoes a reversible chemical reaction whose equilibrium point shifts based on surface conditions compared to downhole conditions.

Another aspect of the invention provides a geothermal power system. The geothermal power system comprises a downhole turbine configured to operate within a wellbore, a downhole electrical generator configured to operate within the wellbore and to be driven by the turbine, and a channel for directing a working fluid through the turbine in order to drive the turbine. The channel is a continuous channel which comprises a feed portion configured to allow the working fluid to flow in a direction away from a surface and a return portion configured to allow the working fluid to flow in a direction towards the surface. The feed and return portion are configured to sit within the wellbore.

In some embodiments, the turbine is a gas turbine positioned within the return portion. In some embodiments, the turbine is a liquid turbine positioned within the feed portion. In some embodiments, the system comprises multiple turbines within the wellbore. In some embodiments, the system comprises multiple turbines and generators operating within a single thermal circuit to allow multiple reheat cycles between the turbine generator units. In some embodiments, the system is configured to be positioned in a horizontal well having a vertical section and a horizontal section, such that the turbine is configured to be positioned toward the bottom of the vertical section or in the horizontal section. The system may be configured to operate at a maximum downhole temperature of between 60-150° C.

In some embodiments, the turbine comprises a reaction turbine, an impulse turbine, or a Tesla turbine. The turbine may comprise other types turbines described herein. In some embodiments, the geothermal power system comprises two turbines positioned at the same overall measured depth in opposing channels connected to a single generator. In some embodiments, the turbine is located in the return portion of the channel, and the geothermal power system is configured to control the flow of the working fluid such that the working fluid changes from a supercritical state to a gaseous state before reaching the turbine as it flows along the return portion. In some embodiments, the feed portion is thermally insulated from the return portion such that feed flow does not begin to vaporize until after a liquid turbine and/or within a horizontal section before a gas turbine, and the working fluid remains in a non-liquid state until it reaches the end of the return portion at surface. In some embodiments, the wellbore is within a depleted oil and gas formation and wherein the wellbore is resealed to prevent fluid and pressure communication between the wellbore and formation. In some embodiments, the feed portion comprises one or more pressure-drop components configured to reduce the pressure of the working fluid. In some embodiments, the pressure-drop component is positioned towards the bottom of the vertical section of the well before the horizonal portion. The pressure-drop component may comprise one or more of: an expansion valve, a choke valve and a liquid turbine.

Another aspect of the invention provides a method of generating power. The method comprises directing a working fluid down a continuous downhole channel extending between a feed and a return at surface. As the working fluid is directed down a first portion of the channel, temperature and pressure of the working fluid are increased. The working fluid then passes through a turbine to lower its pressure and generate power. After passing through the turbine, the working fluid is directed to a second portion of the channel where its temperature is further increased. The working fluid is then directed back to surface through a third portion of the channel due to the thermosyphon effect.

The working fluid may have an initial temperature at surface, an intermediate temperature before passing through the turbine, and a maximum temperature at the second portion of the channel after passing through the turbine. In some embodiments, the difference between the maximum temperature and the intermediate temperature is greater than the difference between the intermediate temperature and the initial temperature. In some embodiments, the working fluid directed down the channel is in a liquid phase, and the working fluid transitions to a gas phase at the second portion of the channel. For example, the working fluid may be $N_2O_4$ in the liquid phase and undergoes an endothermic reversible chemical reaction at the second portion of the channel to become $NO_2$ in the gas phase.

In some embodiments, the method comprises creating the downhole channel by inserting a liner into a wellbore. In some embodiments, the wellbore is pre-conditioned with a lubricant containing nanoparticles and filler before inserting the liner into the wellbore, with the lubricant occupying space between the liner and the wellbore. In some embodiments, the method comprises controlling the flow rate of the working fluid directed down the channel based on thermal deliverability of the downhole geothermal resource. The downhole geothermal resource may heat the working fluid to increase its temperature as it flows through the channel.

Additional aspects of the present invention will be apparent in view of the description which follows.

BRIEF DESCRIPTION OF THE DRAWINGS

Various objects, features and advantages of the invention will be apparent from the following description of particular embodiments of the invention, as illustrated in the accompanying drawings in which.

DETAILED DESCRIPTION

Figure 1A:
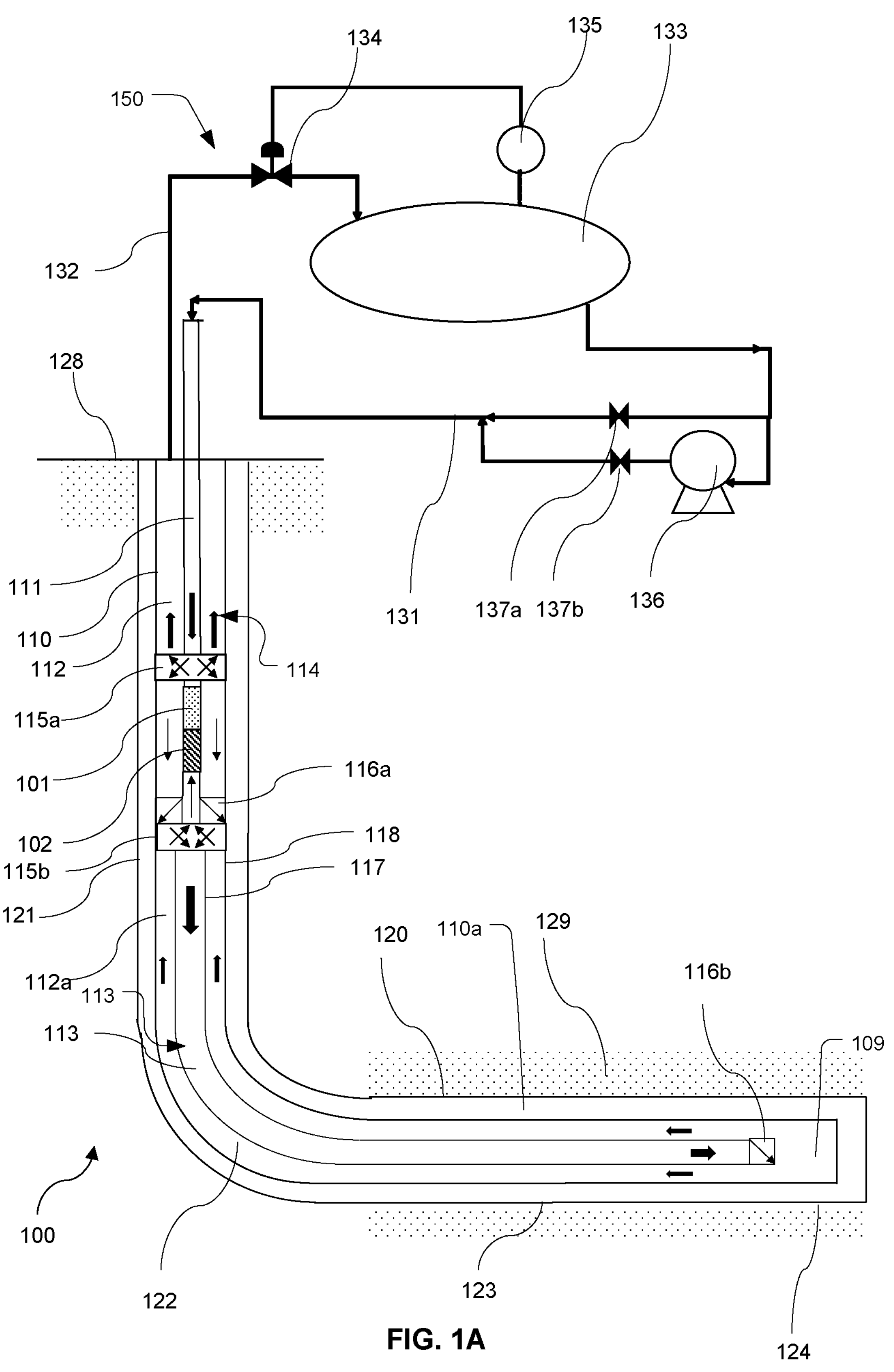
FIG. 1A is a schematic view of an example embodiment of a geothermal power system.

The description which follows and the embodiments described therein are provided by way of illustration of examples of particular embodiments of the principles of the present invention. These examples are provided for the purposes of explanation and not limitation of those principles and of the invention.

Introduction

The present technology relates to systems and methods for converting a single inactive well (e.g., a horizontal well), typically a depleted oil or gas well, into a geothermal electricity generator. Systems described herein may be retrofitted to the well and designed for a working fluid to vaporize in the subsurface and condense at or near the surface. Systems described herein may comprise one or more turbines and generators located within a channel for insertion into the subsurface. In operation, the turbine(s) and generator(s) may be located at optimum depths subsurface for electricity production.

For the purposes of facilitating the description, the term "turbine" (as used herein) refers to a pressure release device and/or a rotary mechanical device that extracts energy from fluid flow. Such devices may include one or more of the following: a gas turbine, a liquid turbine, an impulse turbine, a Pelton wheel turbine, a Francis style turbine, a hydroelectric style impulse or reaction turbine, a positive displacement turbine, a pressure let down turbine, a Tesla turbine, a turbine having blades and/or vanes, a piston expander, a turbo expander, a flow restrictor like a choke, an expansion valve, an impeller, a Stirling engine turbine, a reciprocating pressure let down mechanism, and a shape memory alloy actuator, piston, reciprocating device, or valve.

For the purposes of facilitating the description, the term "generator" (as used herein) refers to a device that converts energy harvested by the turbine (e.g., mechanical energy) into another form of energy (e.g., electrical energy). Such devices may include one or more of the following: a permanent magnet motor generator, a linear generator, an axial flux generator. Such devices may be designed or otherwise configured to convert energy harvested by turbine into DC electricity or AC electricity. Such devices may be configured to generate between 5 kW and 300 kW of electricity in some cases.

Turbine(s) and generator(s) described herein may be separate components or components that are integrally formed. For example, it is within the scope of the present invention to use a thermal electric generator (e.g., in shape of a tube, in which the cold fluid inside the tube is at a higher pressure than the annular space and the tube is narrow enough to cause a Joules-Thompson effect, where the pressure drop cools the fluid) to convert fluid flow into electricity. Turbine(s) and generator(s) may collectively be referred to herein as "turbine generators".

The present technology can be adapted to support a wide range of well configurations to produce electricity. The amount of electricity that can be produced can depend of the location, temperature profile, depth, and size of the well. Illustratively, the present technology can be retrofitted to convert depleted horizontal oil and gas wells that were not purposely drilled into a geothermal resource. These types of oil and gas wells are typically abandoned and rarely repurposed as a geothermal source. There are thousands of such depleted wells in North America alone. Retrofitting existing wells can eliminate the drilling cost, reduce resource risks associated with a geothermal project, and mitigate the need to abandon these wells. Alternatively, the present technology can be adapted to support wells that have been drilled for the purposes of generating power from geothermal resources.

The present technology will typically use a closed loop system, where a working fluid (e.g., an organic fluid) can be circulated therethrough to drive the turbine(s) directly. In such closed loop systems, there will be minimal or essentially no mass transfer between the system and the surrounding environment (whether on surface or in the subsurface). Heat transfer into or out of the closed loop system is heat moving through a closed loop barrier. The closed loop barrier may be formed downhole by installing a physical barrier in the wellbore or sealing the wellbore from surrounding formation with a binder like cement or epoxy. A flow path (e.g., coaxial flow path and/or a continuous single loop) will be provided within the closed loop barrier and an aboveground surface structure. Electricity can be generated by the system in a continuous mode and/or in a store and release mode (i.e., where pressure is allowed to build and then released through a turbine).

With the intention of creating electricity from a geothermal resource, traditional technologies require bringing the heat to the surface, and then converting some of the aboveground heat energy to electricity in a direct process or in a binary fluid process.

In contrast, the present technology brings the electric generator to the heat source, which can, illustratively, reduce the amount heat lost from the working fluid before the heat energy is converted to electricity, reduce the amount of energy lost from lifting the fluid to the surface, and/or increase the amount of energy available to create power as a result of the pressure gradient increasing the downhole pressure of working fluid in the well. By including electric generator and turbine subsurface, the present technology can generate energy from the pressure differential created due to the weight gradient created in the fluid column down. Part of the energy of the created pressure can be converted into electricity. This is in contrast with other geothermal systems which require bringing the heated fluid to the surface before extracting energy, where the weight of the fluid may be a parasitic energy cost. In addition, expansion of the working fluid across a gas turbine is an endothermic process that causes the temperature of the fluid to drop. Since the rate of conductive heat transfer into the system is influenced by the temperature difference between the working fluid and the surrounding subsurface formation, providing turbine(s) and electric generator(s) downhole near the heat source (i.e., to allow pressure drop of the working fluid in the subsurface) can increase the amount of heat that can be transferred into the system.

Design Considerations

The design or configuration of the system may depend on one or more of: the depth of the well, diameter of the well, length of the horizontal lateral portion of the well, the temperature gradient within the well, surface temperature fluctuations, and/or desired operating mode. Aspects or features of the system that may be varied or designed include, but are not limited: the working fluid of the system, the dimensions of the feed portion relative to the dimensions of the return portion (e.g., the ratio of a tubular diameter to the annular diameter in coaxial channel designs), the amount of insulation between the system and the surrounding formation, the amount of insulation between the feed portion and the return portion, the number of turbines down hole, the number of turbines above surface, the configuration of the fluid flow path within the system (e.g., including use “crossovers” in a coaxial channel, the number of crossovers, the depth of the crossover, etc.), and depth of the turbine(s).

For most designs variations, the turbine is located somewhere within the closed loop, and at a desired or optimal location within the channel to provide power output. As described in more detail below, one or more turbines may be located: in the horizontal section of the well, in the vertical section of the well, and/or on the surface. Different configurations will have different trade-offs between, for example, maximizing the system’s power production and facilitating easy installation and repair of the system.

To set up the system for retrofitting a well, a working fluid that liquefies at surface and vaporizes/expands (i.e., becomes less dense) in the subsurface is selected. The working fluid may be a fluid that undergoes a reversible chemical reaction and/or a fluid that enhances the energy output of the system through a chemical energy storage and transportation mechanism. The working fluid may be a mixture of various substances, as described in more detail below.

In some cases, the heat transfer potential of the working fluid in the subsurface can be estimated, and the number and location of the turbine generators within the closed loop system may be specified based on the estimation. Other design scenarios may be evaluated to increase or maximize electricity produced.

For example, the working fluid may be in a supercritical state at the bottom of the well in some cases. In such cases, the working fluid, despite not vaporizing, will still need to undergo a sufficient density change as the temperature increases to encourage a thermosyphon. The density changes will correspond to changes in pressure. The density of the working fluid will increase with depth and decrease as pressure is decreased across a turbine or expansion valve.

As another example, the flow rate of the thermosyphon can be affected by the surface temperature. When the temperature differential between the surface and bottom hole is relatively small, the pressure differential between the surface and bottom hole will be relatively low, thereby lowering the amount of power produced. Therefore, the system may be designed or otherwise configured to operate over a variable range of temperatures. Too much heat during the day may lower the flow rate and risk halting the thermosyphon. In this case, the working fluid may be adjusted to facilitate operation in a range of conditions.

The system may also be designed to include a store and release operating mode. Some embodiments of the system may be capable of dispatchable power generation. The store and release operating mode may use a valve to allow pressure and temperature to build up in the subsurface portion of the closed loop as the temperature of the working fluid builds. For example, a heavier working fluid (e.g., a working fluid that requires a longer residence time in the subsurface to vaporize than the temperature that would be established at pseudo steady stage with a constant flow rate) can be accumulated down hole for a couple of hours in the middle of the day, and then released after the sun goes down to generate power for 6-12 hours until the next day.

Various aspects of the technology will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present technology.

Vertical Inner Passage Gas Turbine Configuration

FIG. 1A shows a geothermal power system 100 according to an example embodiment. System 100 includes electric generator 101 and one or more turbines 102 located in a channel 110. Electric generator 101 is mechanically coupled to and operated by turbine 102. Channel 110 facilitates or helps direct flow of a working fluid through turbine 102 in order to drive turbine 102. Channel 110 has a feed portion 111, a return portion 112, and toe portion 109 (i.e., a turn-around section) located between feed portion 111 and return portion 112. Feed portion 111 and return portion 112 facilitate or help direct flow of the working fluid in generally opposing directions within channel 110. Toe portion 109 places feed portion 111 in fluid communication with return portion 112. The working fluid may be supplied to feed portion 111 by surface structure 150. The working fluid may return to surface structure 150 through return portion 112. Surface structure 150 may be a part of system 100.

Channel 110 has a channel length corresponding to the length of feed portion 111, which is generally the same as the length of return portion 112. Channel 110 has a channel length that is typically in the range of 1.5 km to 10 km, although lengths outside of this range are also possible depending on the size of the well.

In operation, channel 110 (and generator 101 and turbine 102 supported therein) is inserted into or otherwise formed within wellbore 120 of a well. The well may be a horizontal well as depicted in FIG. 1A or other types of wells. Channel 110 may be formed within a casing 118 that isolates channel 110 from formation 129 (i.e., casing 118*a* is capable of holding a pressure seal). Casing 118 may be or may include a liner hanger that is inserted into wellbore 120. For example, casing 118 may be a combination of a preexisting casing and a newly inserted liner in the case of a retrofit. Casing 118 may also be referred to herein as the outer wall of channel 110. Outer wall 118 does not need to have constant diameter through the entire length of channel 110.

When channel 110 is formed within wellbore 120, feed portion 111 facilitates or helps direct flow of the working fluid in a direction away from surface 128 and return portion 112 facilitates or helps direct flow of the working fluid in a direction towards surface 128. Feed portion 111 and return portion 112 may be located within the same wellbore 120 as depicted in FIG. 1A, although this is not necessary.

Channel 110 may be a closed channel configured to contain the working fluid downhole (i.e., channel 110 does not facilitate fluid exchange with formation 129). Channel 110 may be a continuous channel. Channel 110 may be provided within a single continuous wellbore 120 between a single opening at surface 128 and a single turn-around point downhole (e.g., channel 110 does not need to be forked or bifurcated into multiple sub-wellbores below the surface). Channel 110 may be a continuous channel extending between a feed and a return at surface 128. The continuous channel may have various portions. For example, the continuous channel may have a first portion located proximate to the feed, a third portion located proximate to the return, and a second portion located between the first and third portions.

A space 110*a* may surround channel 110 downhole (i.e., a continuous space between casing 118 and formation 129). Space 110*a* may be filled with aqueous fluids, cement, or the like. Space 110*a* may be sectioned off (i.e., one fluid or substance in one portion may be a different fluid than another). For example, space 110*a* may be filled with cement in a top portion and water in a bottom portion.

For horizontal wells, wellbore 120 has a vertical section 121 closer toward surface 128 and a horizontal section 123 farther away from surface 128. Vertical section 121 does not need to be strictly vertical. Horizontal section 123 does not need to be strictly horizontal. For example, vertical section 121 and horizontal section 123 may form an angle of 65° to 85° therebetween. As another example, vertical section 121 and surface 128 may form an angle of 65° to 85° therebetween. For some wells, vertical section 121 will be at least 1 km long. For some wells, vertical section 121 will be 5 km or less. For some wells, horizontal section 123 will be at least 500 m long (e.g., 1 km or longer). For some wells, horizontal section 123 will be 5 km or less.

For horizontal wells, the portion connecting vertical portion 121 to horizontal portion 123 may be referred to herein as heel 122. The farthest point in the wellbore 120 from the surface 128 may be referred to herein as toe 124. When channel 110 is inserted in the well, it too will have a vertical portion, a horizontal portion, a heel, and a toe (i.e., the furthest part of the channel from the surface).

Generally, the temperature of the formation 129 in a geothermal system increases with depth (e.g., linearly). Therefore, the temperature will change with length in the vertical section 121 but not as much with length in the horizontal section 123. Horizontal section 123 will be the hottest section of wellbore 120 with a relatively uniform temperature compared to the larger temperature gradient in vertical section 121. The temperature of formation 129 around vertical section 121 and horizontal section 123 may decrease over time. The temperature of formation 129 around horizontal section 123 may not be symmetrical from the heel to the toe. Illustratively, system 100 may be operated to generate electricity even if the temperature of the formation 129 at the lowest point 124 of the wellbore is relatively moderate (e.g., 150° C. or less).

Channel 110 may be designed or otherwise configured in various ways to provide feed portion 111 and return portion 112 therein. Channel 110 is typically designed to maximize the cross sectional flow area of feed portion 111 and return portion 112 in relation to the size of wellbore 120. For example, if the internal cross sectional area of wellbore 120 is about 100 $m^2$ then channel 110 may be designed to provide feed and return portions 111, 112 with cross sectional flow areas that sum up to about 100 $m^2$. The relative size of the cross sectional flow areas of feed and return portions 111, 112 may be designed or otherwise configured to provide a desirable fluid pressure gradient profile within channel 110.

In some embodiments, channel 110 comprises a partition dividing channel 110 into feed portion 111 and return portion 112 across a diameter of channel 110. In other embodiments, channel 110 is a coaxial channel with an inner passage 113 and an outer passage 114 separated by an inner wall 117. In such embodiments, outer passage 114 may be an annulus defined by inner wall 117 and outer wall 118, and inner passage 113 may be tubular shaped having a rounded or circular cross-section defined by inner wall 117. Inner passage 113 may have a channel axis that is generally aligned with the channel axis of outer passage 114. Outer wall 118 may be tubular shaped. Outer wall 118 may have a diameter that is in the range of 4" to 7" in some cases.

In the example embodiment depicted in FIG. 1A, inner passage 113 is configured to act primarily as feed portion 111 and outer passage 114 is configured to act primarily as return portion 112 (i.e., with the exception of sections between crossovers described in more detail below). Channel toe 109 is located at the distal end of channel 110 (i.e., the end farthest from surface 128) and defined by the end of outer wall 118 and an end wall of channel 110. Channel toe 109 facilitates fluid communication between inner passage 113 and outer passage 114.

Such configuration allows outer passage 114 to exchange heat with formation 129 through outer wall 118 (i.e., outer wall 118 exchanges heat with formation 129 through the substance of fluid filling space 100*a*), and inner passage 113 to exchange heat with outer passage 114 through inner wall 117. Illustratively, such configuration allows the heat transfer to be affected by the thermal conductivity (i.e., using thermally conducing or insulating materials) of the wall separating inner passage 113 and outer passage 114. Such configuration can also provide a relatively large cross-sectional area for fluid flow. This can be important in small wellbores 120 with moderate formation temperatures.

In some embodiments, inner wall 117 is partially made of a thermally conductive material to facilitate heat exchange between feed portion 111 and return portion 112 along a first portion of channel 110 and partially made of a thermally insulated material to restrict heat exchange between feed portion 111 and the return portion 112 along a second portion of channel 110. The insulation may be designed or otherwise configured to reduce heat transfer, or to insulate outer passage 114 from formation 129 (especially near the surface) to accommodate the design selection of the working fluid and to prevent fluid from condensing or vaporizing at the inappropriate locations within channel 110. The insulation may be implemented using a vacuum cavity (e.g., Vacuum Insulated Tubing (VIT)) or other suitable means.

In some embodiments, the insulated part of inner wall may 117 has an overall heat transfer coefficient that is in the range of 8 $W/K \cdot m^2$ to 10 $W/K \cdot m^2$. In some embodiments, the insulated part covers at least one half of the total vertical depth of the well. For example, the insulated part may cover at least 1 km. In some embodiments, the insulated part is located at horizontal section 123 (e.g., when the return flow is through outer passage 114 as shown in FIG. 1A).

Since inner passage 113 is not in direct thermal contact with formation 129, system 100 may include crossover sections 115 located at various segments between inner wall 117 and outer wall 118 to control heat transfer. For brevity, crossover sections 115 may also be referred to herein as crossovers. Crossovers 115 are located at select portions between inner wall 117 and outer wall 118 to move feed portions 111 and return portions 112 between inner passage 113 and outer passage 114 (i.e., at different depths of the closed loop system). Through the use of crossovers 115, feed portions 111 and return portions 112 for the working fluid may switch between the inner passage 113 and outer passage 114 of channel 110. This can create desirable temperature and/or pressure gradients to set up a thermosyphon within system 100 and/or optimize heat transfer within system 100.

The locations of crossovers 115 may be designed or otherwise selected based on one or more of the following: the temperature profile of the well, the working fluid composition, and the surface temperature range. In some cases, the locations may be selected to ensure that working fluid does not condense into a fluid downstream of turbine 102 before reaching surface 128.

For example, a first crossover 115*a* may be located above generator 101 and turbine 102 to facilitate movement of the working fluid from inner passage 113 to outer passage 114 in feed portion 111, and a second crossover 116*b* may be located below generator 101 and turbine 102 to facilitate movement of the working fluid from outer passage 114 back to inner passage 113 in feed portion 111. First crossover 115*a* will also facilitate movement of the working fluid from inner passage 113 to outer passage 114 in return portion 112. Second crossover 115*b* will also facilitate movement of the working fluid from outer passage 114 to inner passage 113 in return portion 112.

Figure 1B:
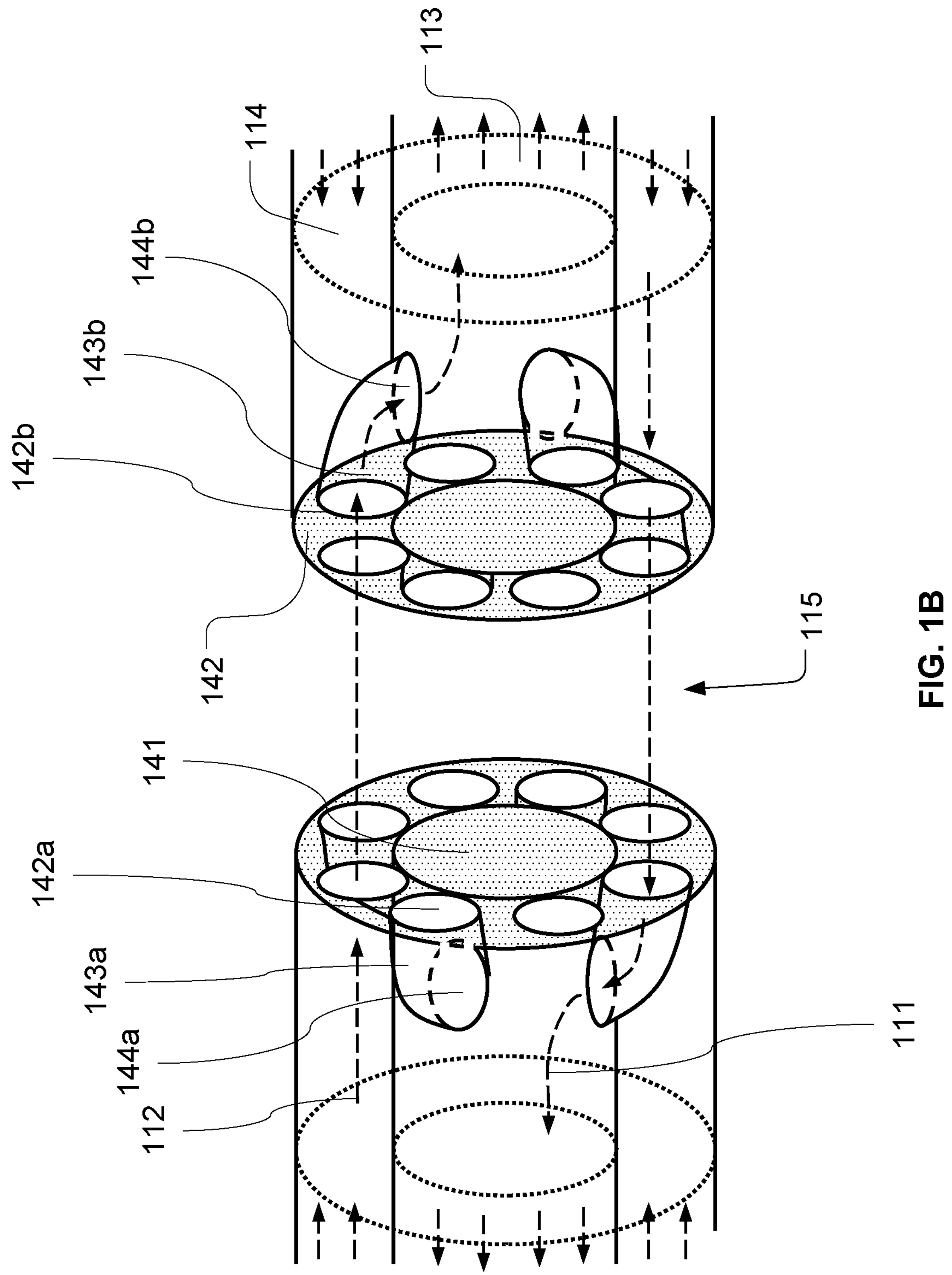
FIG. 1B is an exploded perspective view of a crossover used in conjunction with the geothermal power system of FIG. 1A.

FIG. 1B shows an example embodiment of crossover 115. Crossover 115 is configured to move the feed and return flows of the working fluid between inner passage 113 and outer passage 114 of channel 110. Crossover 115 may include a first set of connectors fluidly connecting inner passage 113 and outer passage 114 in a feed portion, and a second set of connectors fluidly connecting inner passage 113 and outer passage 114 in a return portion.

In the example illustrated in FIG. 1B, crossover 115 has an inner passage blocking plate 141 located in inner passage 113 and an outer passage blocking plate 142 located in outer passage 114. Inner passage blocking plate 141 prevents flow in inner passage 113 from continuing on in inner passage 113. Outer passage blocking plate 142 prevents flow in outer passage 114 from continuing on in outer passage 114.

In the example depicted in FIG. 1B, inner passage blocking plate 141 has a circular cross section shaped to conform to the circular cross section of inner passage 113. Outer passage blocking plate 142 has an annular cross section shaped to conform to the annular cross section of outer passage 114. Outer passage blocking plate 142 includes a series of outer-passage holes 142*a*, 142*b* spaced circumferentially around the annulus. Each outer-passage hole 142*a*, 142*b* is connected to a corresponding inner-wall hole 144*a*, 144*b* of inner wall 117 through a connector. In the FIG. 1B example, the connectors are interdigitated tubes 143*a*, 143*b*. Tubes 143*a*, 143*b* allow fluid to be exchanged between inner passage 113 and outer passage 114.

In the example depicted in FIG. 1B, outer passage blocking plate 142 includes a first set of outer-passage holes 142*a* for allowing fluid flowing in a feed portion 111 to be directed from outer passage 114 to inner passage 113, and a second set of outer-passage holes 142*a* for allowing fluid flowing in a return portion 112 to be directed from outer passage 114 to inner passage 113. Other designs of crossovers 115 are also possible within the scope of the present invention.

Referring back to FIG. 1A, a relatively cold working fluid feed flow is introduced in its liquid phase into inner passage 113 by a pump 136. Pump 136 may be employed during start-up or to increase the pressure of working fluid if system 100 is used for short term energy storage. Pump 136 may be used to establish thermal profiles as the working fluid flows up and down. For example, the flow rates, pressure, temperature (i.e., insulation), and composition of the working fluid may be controlled or selected such that the feed fluid is not vaporized until it reaches the bottom of wellbore 120, and that the return fluid is able to reach the surface (i.e., the return flow of the working fluid does not liquefy on its way up or is traveling with sufficient velocity to the extent that it carries small amounts of liquids so it does not drop back down wellbore 120 due to gravity, fluid traveling down feed portion 111 does not heat up sufficiently to the extent that its density decreases to cause the fluid to reverse direction due to buoyancy, and/or the pressure drop in front of the fluid is the path of least resistance, etc.). The working fluid flows downwards through the vertical portion 121 of channel 110 until it reaches heel 122 when it begins to flow horizontally through horizontal section 123. The working fluid may flow through both inner passage 113 and/or outer passage 114 as it travels downwards through the vertical portion 121, as described in more detail below.

Upon reaching toe 109 of channel 110, the working fluid moves from inner passage 113 to outer passage 114. As depicted in FIG. 1A, the return flow of the working fluid in horizontal section 123 is through outer passage 114 of the coaxial channel 110 (i.e., as indicated by the arrows in FIG. 1A). This permits working fluid flowing through horizontal section 123 to be heated directly by formation 129 through substance contained within space 100*a*. When the working fluid is heated, it expands and moves toward surface 128. In contrast, the denser working fluid flowing away from surface 128 through inner passage 113 is partially insulated from outer passage 114, thereby setting up a thermosyphon within system 100 to help return the working fluid above surface 128 (i.e., a thermosyphon is created by the heat of formation 129 and cooling duty on surface 128 affecting the density of the working fluid).

Figure 1C:
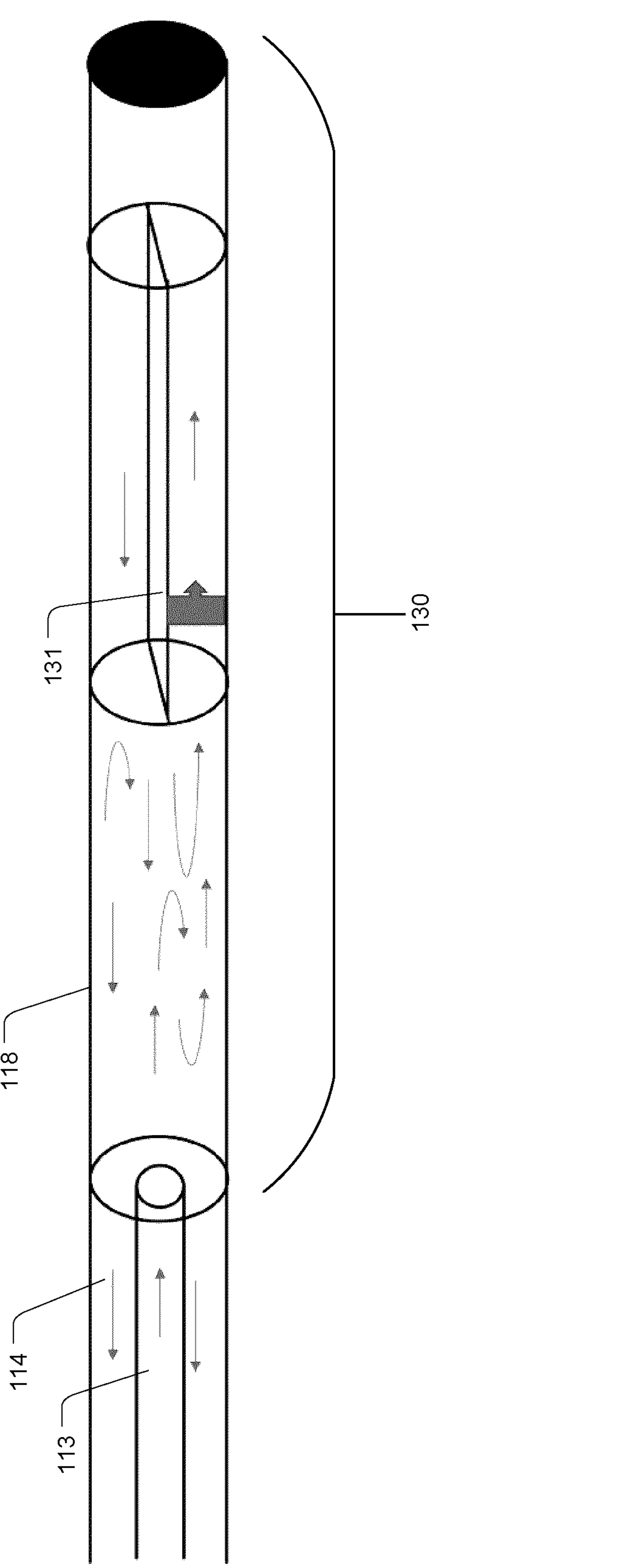
FIG. 1C is a schematic view of an embodiment of a downhole accumulator.

In some embodiments, the end of inner passage 113 (i.e., directly at or before toe portion 109) comprises several hundred meters of liner that can act like an accumulator 130 (e.g., see FIG. 1C). In such embodiments, accumulator 130 can provide natural convective mixing as a result of the density and pressure differential resulting from a residence time difference for a certain modicum of fluid. The length of accumulator 130 can designed or otherwise configured based on the length of horizontal section 124 of wellbore 120. For example, the length of accumulator 130 can be up to 1 km if the length of the horizontal portion 123 of wellbore 120 is 2 km. Accumulator 130 could be formed inside the horizontal liner, or several hundred meters away from the liner at a divide 131 partitioning the end of channel 120 into two semi cylindrical channels.

In the example embodiment depicted in FIG. 1A, generator 101 and turbine 102 are located at vertical portion 121 of channel 110. Generator 101 and turbine 102 may be located near the bottom of vertical portion 121 (e.g., generator 101 and/or turbine 102 may be more proximate to heel portion 123 than to surface 128). This can help ensure that the working fluid is still sufficiently hot (i.e., has not been cooled by the cooler formation 129 via substance contained in space 100*a* at shallower depths) when it reaches turbine 102. Insulation may be provided for inner wall 117 to insulate the cooler fluid travelling down inner passage 113 from the hotter fluid travelling up outer passage 114.

As depicted in FIG. 1A, turbine 102 may be located in inner passage 113 of coaxial channel 110. Turbine 102 may be driven by gaseous working fluid flowing towards surface 128 in inner passage 113. Illustratively, positioning turbine 102 in inner passage 113 within system 100 may allow a simpler construction of system 100 than positioning turbine 102 in outer passage 114. In embodiments where the working fluid is in a supercritical state at the bottom 124 of well 120, turbine 102 may be supported by inner wall 117 or outer wall 118 (or both) at a location within channel 110 above the depth at which the working fluid transitions from a supercritical state to a gas state (i.e., where there is a significant density change from a liquid state to a gas state).

A fluid in a supercritical state may also be referred to herein as a supercritical fluid (SCF). An SCF can be any fluid that is at a temperature and pressure above its critical point, where distinct liquid and gas phases do not exist, but below the pressure required to compress the fluid into a solid.

With turbine 102 positioned beneath surface 128, system 100 may have access to additional sources of energy for converting to electricity. For example, pressure loss due to the fluid gradient or friction forces may be partially regained. Namely, part of the pressure drop that is incurred as the working fluid flows from the bottom of the wellbore 120 to the top can be conserved if the pressure drop across turbine 102 is taken in the subsurface. As described in more detail elsewhere herein, the density of the working fluid can be changed, possibly through a phase change, at the bottom of wellbore 120 and/or on its way to surface 128, which may enhance the thermosyphon effect within system 100.

To facilitate an inner passage gas turbine, system 100 may include two or more crossovers 115 for moving the working fluid between inner passage 113 and outer passage 114. In the FIG. 1A example embodiment, a first crossover 115*a* is located above turbine 102 and a second crossover 115*b* is located beneath turbine 102. In such embodiments, the pressure of the working fluid exiting turbine 102 should be high enough for it to flow to surface 128 as a gas without dropping out liquids. Likewise, the pressure drop across the subsurface turbine 102 must not cause excessive amounts of fluid to condense before reaching surface 128.

After passing through turbine 102, the working fluid in inner passage 113 flows through first crossover 115*a* into outer passage 114, and continues to rise through outer passage 114 toward surface 128. In some cases, the returning working fluid can partially heat the cooler feed working fluid (i.e., working fluid flowing down inner passage 113) as the feed working fluid descends into the vertical section 121 of the wellbore 120. This brings the feed fluid up in temperature and pressure so that it can be preheated before the horizontal section 123. Likewise, the feed fluid and the cooler surface formation 129 cools the returning fluid so that it requires less cooling at surface 128 to return to a liquid state.

The returning fluid is typically entirely or primarily in a gaseous state as it rises up from generator 101 to surface 128. In some cases, there may be a small amount of liquid that forms within the fluid. In such cases, the liquid can still be carried to surface if the gas velocity is sufficiently high.

Alternatively, the working fluid may be condensed downhole. In such cases, the working fluid does not need to be processed at surface structure 150 for reinjection. That is, the reinjection may occur downhole at a proximal end of channel 110 (i.e., the end of channel 110 closer to surface 128).

In order to create a thermosyphon in a single closed loop well with bidirectional annular flow, the heat exchange and temperature differential between inner passage 113 and outer passage 114 may need to be carefully managed. The temperature differential that encourages the thermosyphon effect within system 100 is the difference in heat between working fluid flowing in feed portion 111 and the same working fluid flowing in return portion 112. To help encourage the thermosyphon effect, system 100 is designed to encourage a pressure drop across turbine 102 or an additional expansion valve.

In some embodiments, system 100 includes one or more auxiliary pressure-drop components which reduce the pressure of the working fluid. The auxiliary pressure-drop component may be positioned towards the bottom of vertical portion 121 of the well before the horizontal section 123. A pressure-drop component may be configured to cool the working fluid to facilitate an increase in the heat-harvesting capacity in the working fluid. A pressure-drop component may comprise an expansion valve, a choke valve, or the like. Reducing the pressure of the feed working fluid may facilitate vaporization when the working fluid is heated by formation.

In the FIG. 1A example embodiment, the section of channel 110 above first crossover 115*a* is configured to allow heat exchange between inner passage 113 and outer passage 114. For example, the section of inner wall 117 above first crossover 115*a* may be made of a thermally conductive material such as steel. Likewise, the section of inner wall 117 below second crossover 115*b* is configured to allow heat exchange between inner passage 113 and outer passage 114. For example, the section of inner wall 117 below second crossover 115*b* may be made of a thermally conductive material such as steel to increase heat transfer from formation 129 to channel 120 (through substance contained in spacing 100*a*).

On the other hand, the section of inner wall 117 adjacent to turbine 102 is configured to prevent heat exchange between inner passage 113 and outer passage 114. For example, the section of inner wall 117 adjacent to turbine 102 may be made of a thermally insulated material (e.g., a vacuum-cavity inner wall or an inner wall made of non-metallic material) to prevent heat transfer between the inner passage 113 and outer passage 114. The insulation between inner passage 113 and annular outer passage 114 may extend for a distance of between 100 m to 400 m (e.g., 150 m, 200 m, 250 m, 300 m, 350 m) upstream and/or downstream of turbine 102 and generator 101. In some embodiments, insulation between the inner passage 113 and outer passage 114 may extend to a depth of up to 1.5 km below surface 128 and/or until the working fluid is heated and/or pressurized to above it's critical point.

In some embodiments, system 100 includes a number of check valves 116*a*, 116*b* positioned at desirable locations within channel 110 to ensure that the flow is permitted in one direction but prevented in the opposite direction. This can help control the directionality of flow of the working fluid to encourage a thermosyphon. As depicted in FIG. 1A, a check valve 116*b* may be located at toe section 109 between inner passage 113 and outer passage 114. Check valve 116*b* can help prevent excess pressure from building in outer passage 114 due to heat from formation 129 pushing the working fluid backwards up inner passage 113. Another check valve 116*a* may be located adjacent to turbine 102 (i.e., in outer passage 114 adjacent to turbine 102) to ensure that the feed flow continues down into channel 120. Check valves 116*a*, 116*b* may seal the horizontal section 123 of channel 120 (i.e., the hottest part) to encourage pressure build-up in horizontal section 123.

Illustratively, the example configuration of system 100 shown in FIG. 1A is designed to enable a single turbine 102 to generate sufficient amounts of energy from a relatively low temperature formation 129 (e.g., 70° C. to 150° C.). In steady state, system 100 does not need to use power for cooling the working fluid or for moving the working fluid through channel 110 to drive turbine 102. Instead, the working fluid flows down channel 110 due to force of gravity and rises back up due to heat from downhole. That is, the working fluid flows down channel 110 as a liquid, and undergoes an endothermic reaction downhole to vaporize into a vapor state before rising back up channel 110 due to pressure change in the working fluid.

Surface Structure

In some embodiments, system 100 is designed or otherwise configured to liquify the working fluid at surface temperature conditions without any active cooling (e.g., no refrigeration or expenditure of electricity). In such embodiments, passive cooling, air fan cooling, fin cooling, or surface geothermal cooling are some example methods implemented by system 100 to increase the heat transfer rate in order to condense the fluid fast enough to maintain the thermosyphon. For example, system 100 may comprise a geothermal cooling loop in the form of a cooling channel buried at a relatively shallow depth (e.g., less than 200 m) near the surface for condensing the gas received from the heating channel. In addition, system 100 may be configured to facilitate cooling in the first several hundred meters below the surface. This may be facilitated by using a non-insulated thermally conducting (e.g. metal) channel at surface. As another example, system 100 may use a JT (Joule-Thomson) effect to induce cooling at the top or bottom of channel 110. System 100 may comprise a throttle configured to induce the JT effect. The throttle may comprise a constriction, a valve or a porous plug in channel 110.

As the working fluid flows to surface 128, it may be cooled by exchanging heat with formation 129 through outer wall 118 and with the cooler working fluid flowing down through inner wall 117. This can delay liquid drop out until the working fluid reaches above surface 128. The amount of cooling duty required at surface 128 may be reduced by taking advantage of the cooling in vertical portion 121 of wellbore 120 without dropping out liquid that won't be carried with the flowing gas to surface 128.

In the example embodiment shown in FIG. 1A, surface structure 150 of system 100 includes return piping 132 coupled to outer passage 114 and feed piping 131 coupled to inner passage 113. Return piping 132 receives gas phase working fluid from return portion 112 of the downhole channel 110. Feed piping 131 injects or provides liquid phase working fluid into feed portion 111 of the channel 110 (e.g., inner passage 113 in the FIG. 1A example embodiment).

Surface structure 150 comprises a vessel 133 located between feed piping 131 and return piping 132 to facilitate cooling and liquification of the gaseous working fluid. Vessel 133 may comprise heat exchange surfaces to passively distribute heat to the atmosphere. Vessel 133 may comprise a single separator and/or surface piping arranged to allow the working fluid to condense on its way back to feed portion 111. Alternatively, vessel 133 may comprise two or more separators. For example, vessel 133 may include a first separator for the return fluid and a second separator for the fluid before injection. Vessel 133 may optionally include a pump/compressor, located between the two separators, which can be turned off or bypassed in normal thermosyphon operation. Illustratively, providing two separators operating at different pressures above surface 128 allows the thermosyphon of system 100 to be enhanced by creating a larger pressure differential when the working fluid flows to surface 128.

In some embodiments, surface structure 150 includes a second vessel located above surface 128. The second vessel can permit hold up volume of working fluid on surface, in the case of a disruption to system 100. Additional surface storage may be available in a power storage scenario to allow the compressible working fluid to be loaded and unloaded from the geothermal piping system to make up the desired power output as a result of adjusting the flow rate.

On the return piping 132, a valve 134 is provided to allow the back pressure in the return portion of channel 110 to be controlled. The back-pressure valve 134 may be controlled by a controller 135 (e.g., a PI controller) based on the state of working fluid within the cooling vessel 133 (e.g., the temperature of the working fluid). In some embodiments, surface structure 150 includes a surface turbine (now shown) in addition or in alternative to back-pressure valve 134.

The pressure at which the working fluid condenses for a given ambient surface temperature will govern the surface pressure of system 100 (e.g., higher pressure allows condensation at higher temperatures, but lowers the available pressure differential that drives the system). During relatively hot periods of time above surface, system 100 may remain idle until the surface temperature drops below a threshold temperature.

Surface structure 150 may include a start-up pump 136 for establishing the flow rates desired to allow the thermal profile of the working fluid to reach a pseudo steady state. In the example embodiment illustrated in FIG. 1A, pump 136 is connected in parallel to feed piping 111 and whether pump 136 is used may be controlled by bypass valves 137 which determine which parallel leg of the feed piping is being used.

Surface structure 150 may also include a working fluid accumulator (e.g., in embodiments with accumulator 130 downhole).

Multiple Gas Turbine Configuration

Figure 2A:
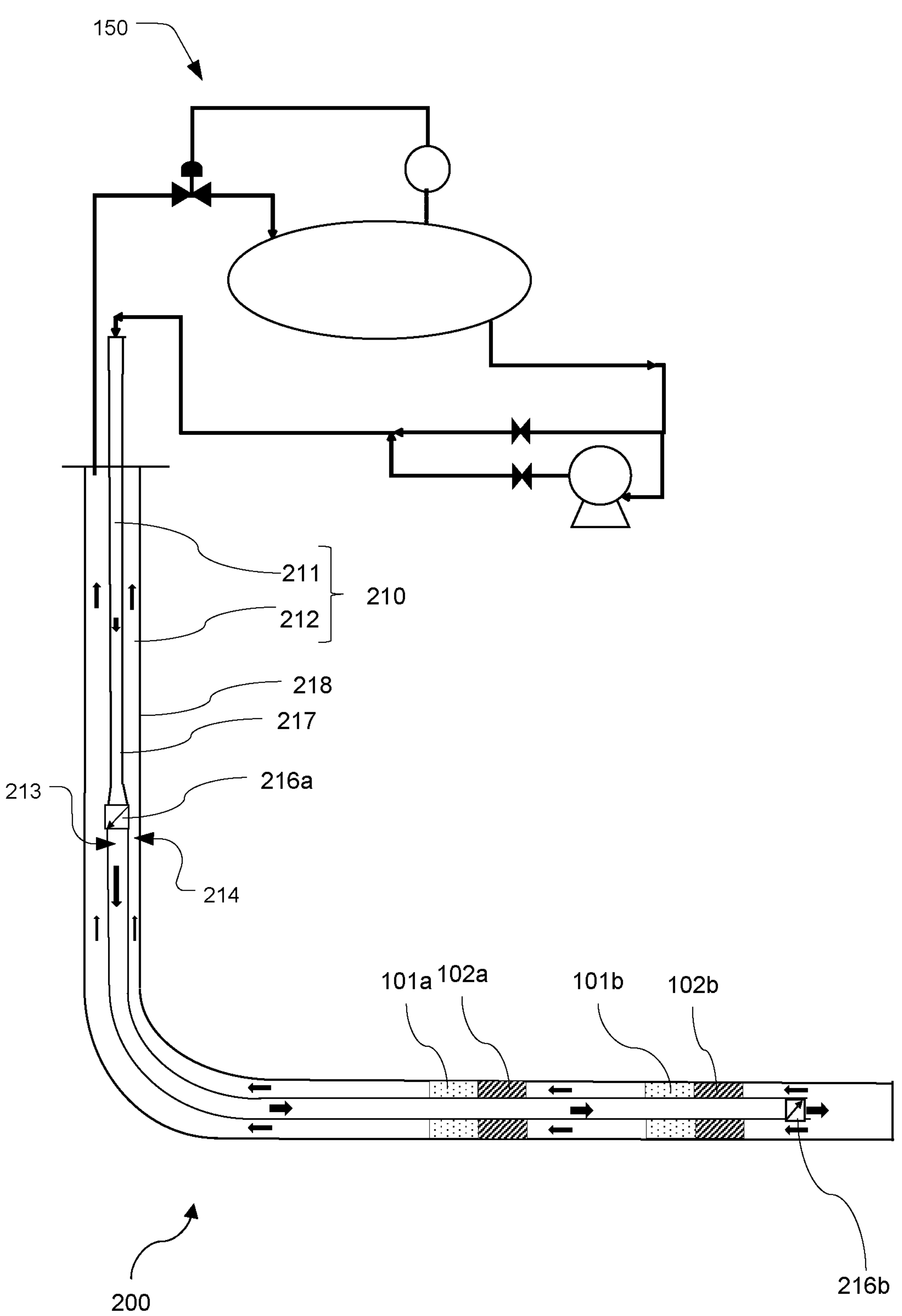
FIG. 2A is a schematic view of another example embodiment of a geothermal power system.

FIG. 2A shows a geothermal power system 200 according to another example embodiment. System 200 includes surface structure 150 similar to the one described above in relation to system 100 and multiple turbines 102 located downhole beneath surface 128. For example, system 200 may include two downhole turbines 102*a*, 102*b* which operate at a horizontal portion 123 of wellbore 120 as depicted in FIG. 2A. System 200 may also include turbines 102 located above surface 128 and/or turbines located in vertical section 121 (not shown). The number of turbines 102 may be selected to optimize the power output of system 100 for a given overall pressure drop. More turbines 102 may be used to induce a higher pressure drop or to harvest more heat for the same overall pressure drop.

Each turbine 102*a*, 102*b* may be mechanically coupled to a respective electrical generator 101*a*, 101*b* to operate the respective electrical generator 101*a*, 101*b*. Alternatively, two turbines may be paired with a single generator with, for example, one turbine located above the generator and one turbine located below the generator to help balance thrust forces on the drive shaft and bearings between turbine and generator.

System 200 includes a channel 210 for facilitating fluid flow through turbines 102*a*, 102*b* in order to drive turbines 102*a*, 102*b*. Turbines 102*a*, 102*b* comprise blades and other workings that may be exposed directly to return portion 212 (i.e., rather than encased in a housing). Channel 210 may be a coaxial channel with inner passage 213 defined by inner wall 217 and outer passage 214 defined by inner wall 217 and outer wall 218.

In some embodiments, outer passage 214 is defined by a tubing (i.e., inner wall 217) that is run into a sleeve (i.e., outer wall 218) and inserted into wellbore 120. In such embodiments, the sleeve may be installed within wellbore 120 first. The tubing and all components supported therein may then be lowered into wellbore 120 as one unit. To replace or repair components (e.g., turbines 102, electric generators 101, etc.), the entire tubing string may be pulled to access the components at surface 128. This design allows the components to be accessed and maintained without having to disassemble the entire channel 210.

In other embodiments, the well could be sealed with cement to define outer wall 218. The cement may, for example, be pumped into open perforations of formation 129 (i.e., in a cement squeeze process). In such embodiments, the well itself may partially define the outer wall 218 of channel 210.

In the FIG. 2A example embodiment, multiple turbines 102 are connected in series. In such embodiments, turbines 102 may be separated from one another by several hundred meters or more. In such embodiments, each one of turbines 102 will harvest a relatively smaller amount of power per turbine due to the relatively lower pressure drop per turbine as compared to designs with a single turbine (e.g., see FIG. 1A). In embodiments with two or more turbines 102, the working fluid will be superheated as it enters each turbine 102, and subsequently reheated after each small pressure drop caused by the fluid passing through the turbine. Accordingly, it can be desirable to position turbines 102 at locations within channel 210 corresponding to horizontal section 123 of the well (i.e., when channel is inserted in wellbore 120) where the temperature is relatively high to allow the working fluid to reheat as it moves from between turbines 102.

Illustratively, a modular design allows turbines 102 to be connected end to end with adequate spacing therebetween for reheat. If each turbine 102 can operate a corresponding generator to provide at least 25 kW of power, then longer wells may be desirable to support multiple turbines (e.g., six (6) or more turbines).

In the example embodiment illustrated in FIG. 2A, each turbine 102 is configured to be driven by flow of the working fluid in outer passage 214. With this configuration, the feed portion 211 is in the inner passage 213 of the channel 210 from injection to toe 209, and the return portion 212 is in the outer passage 214 of channel 210 from toe 209 to surface 128. At the toe 209 of channel 210, working fluid moves from inner passage 213 to outer passage 214 for return back to surface. Each turbine 102 may be an outer passage turbine with a hollow rotor/shaft permitting fluid flowing in the opposite direction through inner passage 213. With this configuration, crossovers are not required. As crossovers can restrict flow, omitting crossovers can increase the flow rate of system 200 compared to system 100.

In other embodiments, some turbines 102 of system 200 may be driven by working fluid flowing through feed portion 111 in outer passage 114 and return portion 112 in inner passage 113. In other embodiments, system 200 may include crossovers that can enhance overall heat transfer (e.g., if the enhancement is a good tradeoff compared to the additional pressure drop).

As in the FIG. 1A example embodiment, check valves 216*a*, 216*b* may be provided at the toe and heel portions of inner passage 213 within feed portion 211 of channel 210 to prevent working fluid from back-flowing into feed portion 211.

Given the surface conditions (e.g., temperature and pressure in the separator(s) of vessel 133, and ambient temperature), a pressure drop will be required down hole to vaporize the fluid before the fluid passes through turbines 102. The pressure drop can be created by an expansion valve, choke, or narrow length of pipe. This pressure drop can also be created by turbines 102 appropriate for liquid or dense phase supercritical fluids. Turbines 102 can be designed or otherwise configured so that the liquid working fluid flowing down the inner passage 213 spins due to the weight of the fluid.

The geothermal piping system of the surface structure can be used for energy storage by operating pump 136 on surface 128 to control the pressure downhole. After the fluid downhole has been given enough time to heat up, it can be converted back into electricity during periods of higher demand.

Figure 2B:
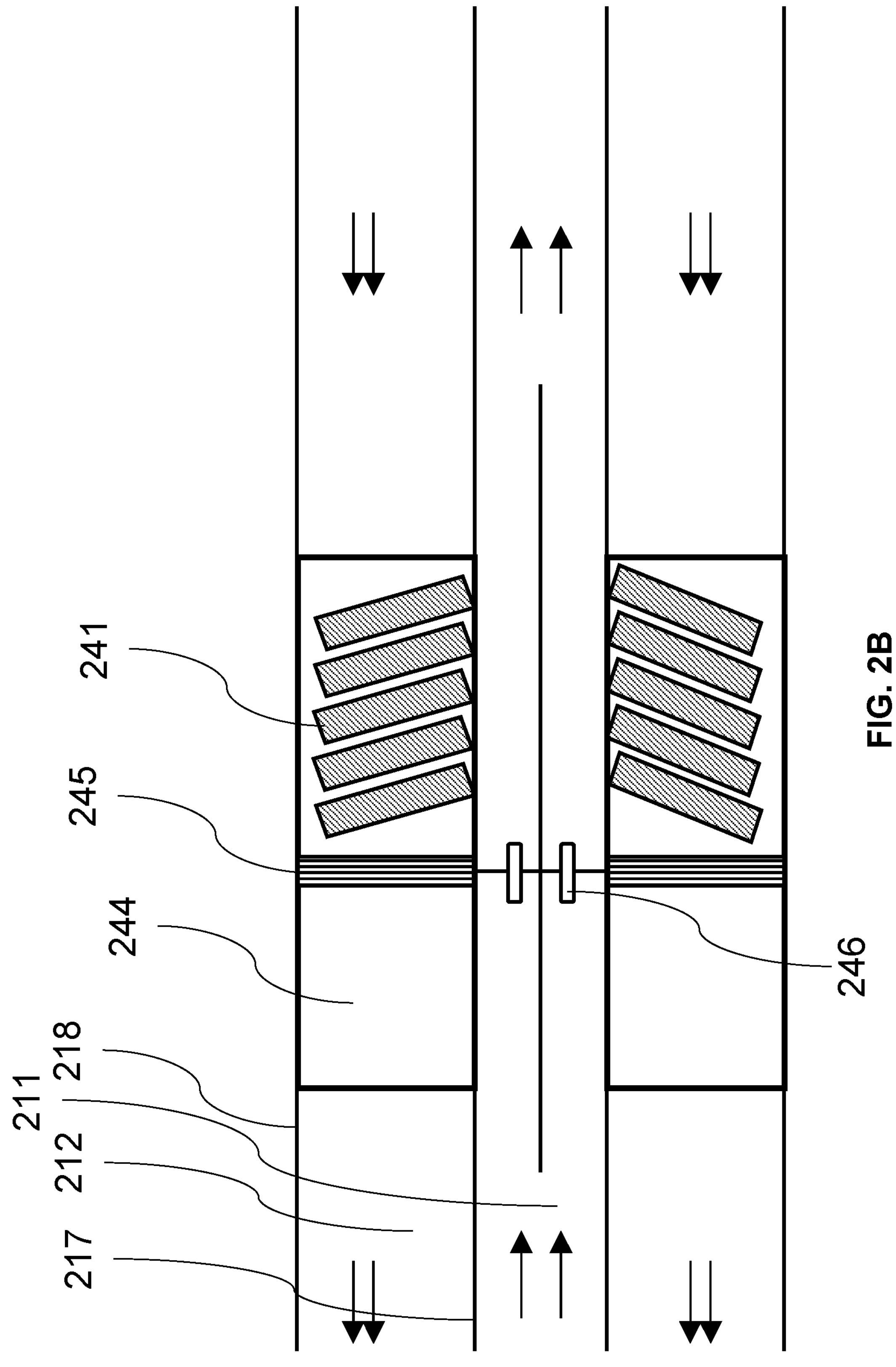
FIG. 2B is a schematic cross-section view of a turbine used in conjunction with the geothermal power system of FIG. 2A.

FIG. 2B shows an example construction of a gas turbine 102 positioned in the outer passage 212 of channel 210. Gas turbine 102 has blades 241 which are driven by the return flow of the working fluid (i.e., as shown by the arrows). The working fluid is heated through the outer wall 218 of channel 210 by the surrounding formation 129. As shown in FIG. 2B, blades 241 are arranged around outer passage 212 outside of inner wall 217 of channel 210 to permit feed flow of working fluid through inner passage 211.

As depicted in FIG. 2B, turbine 102 may be mechanically coupled to bearings 245 of generator 101. Magnets 246 may be fixed in the inner passage 211 as a stator. Coils 244 are attached to or mounted on bearing 245. This configuration allows coils 244 to move with the turbine blades 241 of turbine 214.

In other embodiments, system 200 may be designed or otherwise configured to drive turbines 102 that move magnets 246 with respect to stationary coils 244. In other embodiments, generator 101 comprises magnets 246 and coils 244 that are configured to move in opposite directions (i.e., each being driven by respective flows in the inner and outer passages).

In other embodiments, system 200 may comprises turbines 102 located in both inner passage 213 and outer passage 214 simultaneously. These turbines 102 may rotate counter synchronously and operate to a single generator 101. For example, system 200 may be configured to create a clockwise flow down channel 210 to encourage the liquid turbine to rotate clockwise (relative to direction of fluid flow) and a clockwise flow up channel 210 to encourage the gas turbine to rotate clockwise (relative to direction of fluid flow). With such configuration, the two turbines will rotate in directions opposite to one another. Turbines 102 may be turbo-expander turbines, where the liquid working fluid flowing down channel 210 drives a liquid turbine and the vapor or gas working fluid flowing up drives a gas turbine (e.g., a turbine with fan blade) and the two turbines combine to operate a single generator 101. Alternatively, a liquid turbine may drive the outer pole coils of generator 101 and a gas turbine may drive the armature coil of generator 101. Such embodiments can increase the relative speed of generator 101.

DC power may be generated downhole in system 200 and converted to AC on surface 128. Generating DC power downhole can reduce the need to synchronize the AC power from different turbines rotating independently at different RPMs. Not needing to synchronize the generator output power permits a single cable to be used to send the generated electricity from multiple generators 101 to surface 128.

Vertical Inner Passage Gas Turbine with Inverted Flow

Figure 3A:
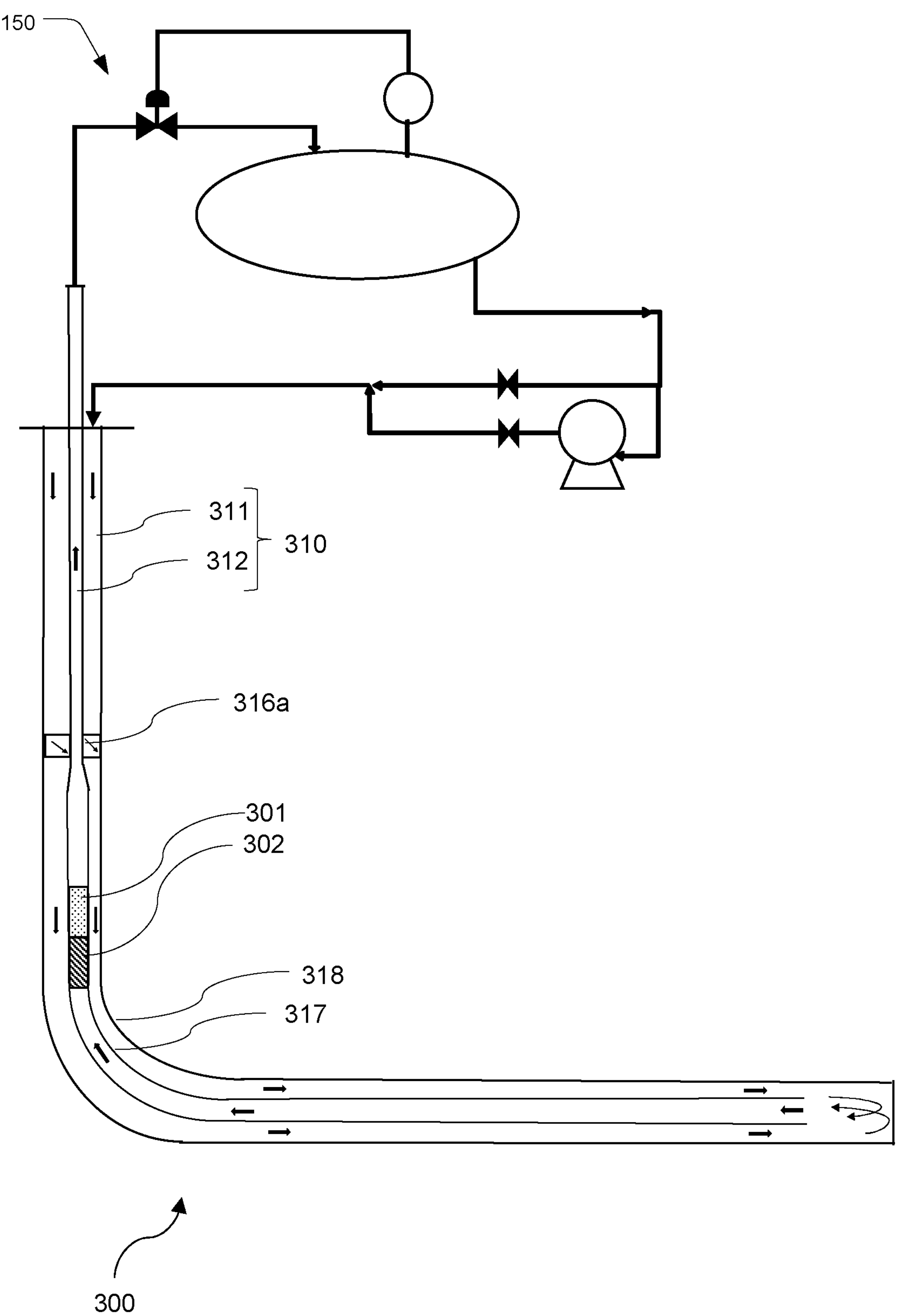
FIGS. 3A-3D are schematic views of various other embodiments of a geothermal power system.

FIG. 3A shows a geothermal power system 300 according to another example embodiment. Geothermal power system 300 includes a surface structure 150 that is similar to that of the previous embodiments. Like system 100 in the first example embodiment, system 300 comprises turbine 302 and generator 301 positioned in the inner passage of the vertical section of the well. However, the flow direction is inverted in system 300 to avoid the use of crossovers. Working fluid is injected into the outer passage of channel 310 at surface 128, travels to toe 309 in the outer passage, and returns to surface 128 through the inner passage of channel 310. In system 300, the working fluid is heated by formation 129 as it travels through feed portion 311 of channel 310 (i.e., outer wall 318 facilitates heat conduction between formation 129 and the working fluid) rather than by formation 219 as it travels through return portion 312 as in previous embodiments.

System 300 may include one or more check valves for preventing fluid from flowing back up through feed portion 311. For example, system 300 may include a check valve 316*a* located in the vertical section of feed portion 311 as depicted in FIG. 3A to ensure that the thermosyphon flows in the correct direction with the expansion of the working fluid causing the fluid to move up the inner passage 312 defined by the inner wall 317 through turbine 302. Check valve 316 may be particularly desirable for systems that are operated as energy storage or in a dispatchable manner. Check valve 316 may be annular shaped to conform to the annular cross section of feed portion 311.

Illustratively, system 300 can be relatively simple to construct. In system 300, the flow path is uninhibited by crossovers, and the centrally mounted turbine 302 and generator 301 in the vertical section can be removed and installed independently of channel 310.

Other Configurations

Figure 3B:
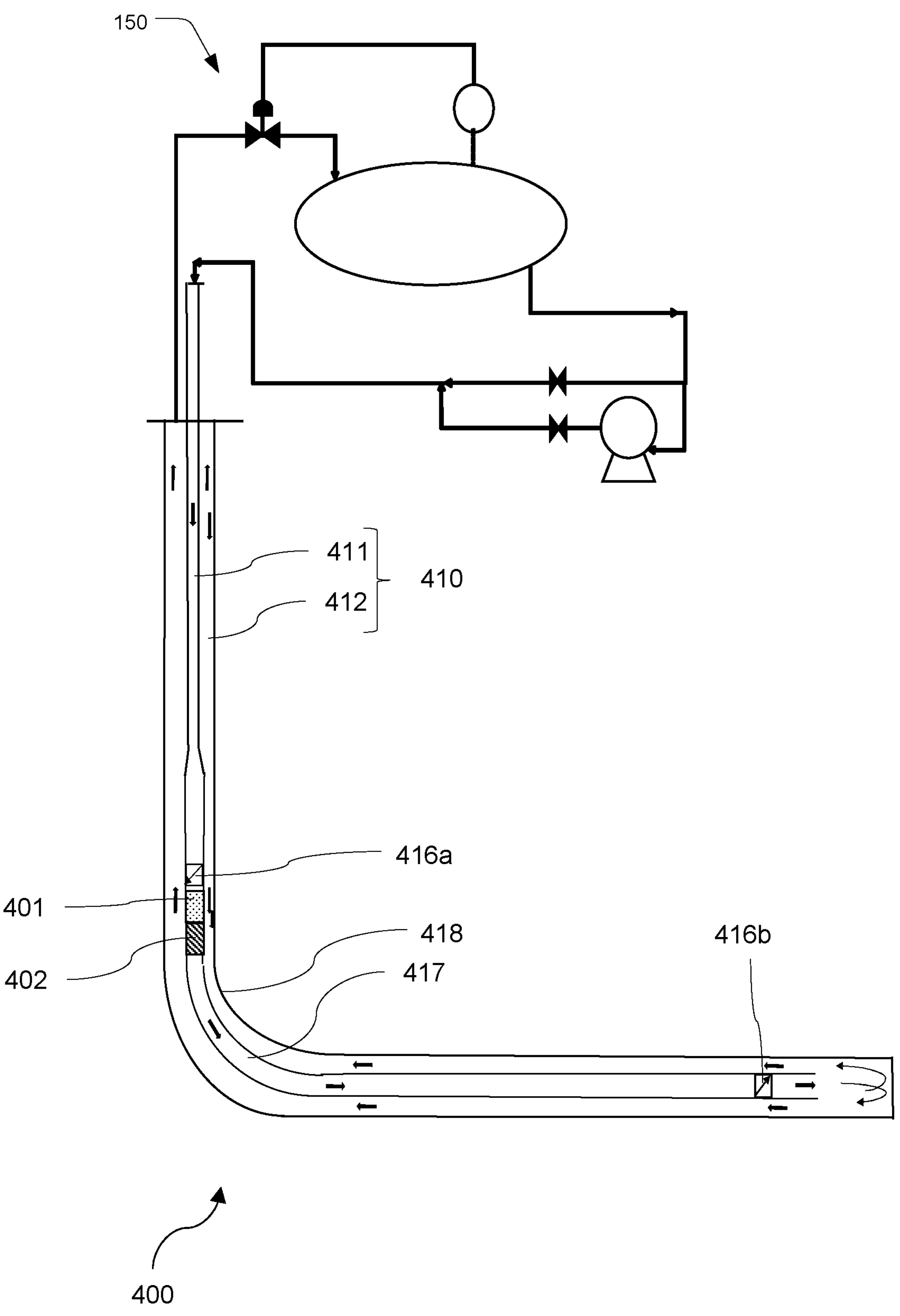

FIG. 3B shows a geothermal power system 400 according to another example embodiment. Unlike the previous embodiments, system 400 comprises a liquid turbine 402 positioned within the feed portion 411 of the channel 410. In system 400, generator 401 may be narrower than the inner passage of channel 410. Working fluid may flow around generator 401 prior to passing through turbine 402, or through generator 401 if generator 401 has a central channel.

The liquid turbine 402 is positioned towards the bottom of the vertical section 121 of the wellbore 120. The feed fluid is directed into the inner passage 411 of the coaxial channel 410. The fluid flows directly through turbine 402 without passing any crossovers. The pressure of the liquid column can help drive turbine 402.

As with the embodiment shown in FIG. 2A, the working fluid passes through the inner passage to toe 409 where it is reversed to flow up the channel through the outer passage. The return fluid is heated by the formation as it flows up towards surface 128. System 400 may optionally include a check valve 416*a* located in the vertical section of feed portion 411 and a check valve 416*b* located at the toe ensure that the thermosyphon causes the liquid to flow in the correct direction (i.e., expansion causes the fluid to move up the inner passage through the turbine).

Like system 300, system 400 can be relatively simple to construct. In system 400, the flow path is uninhibited by crossovers, and the centrally mounted turbine 402 and generator 401 in the vertical section can be removed and installed independently of the other components of channel 410.

Figure 3C:
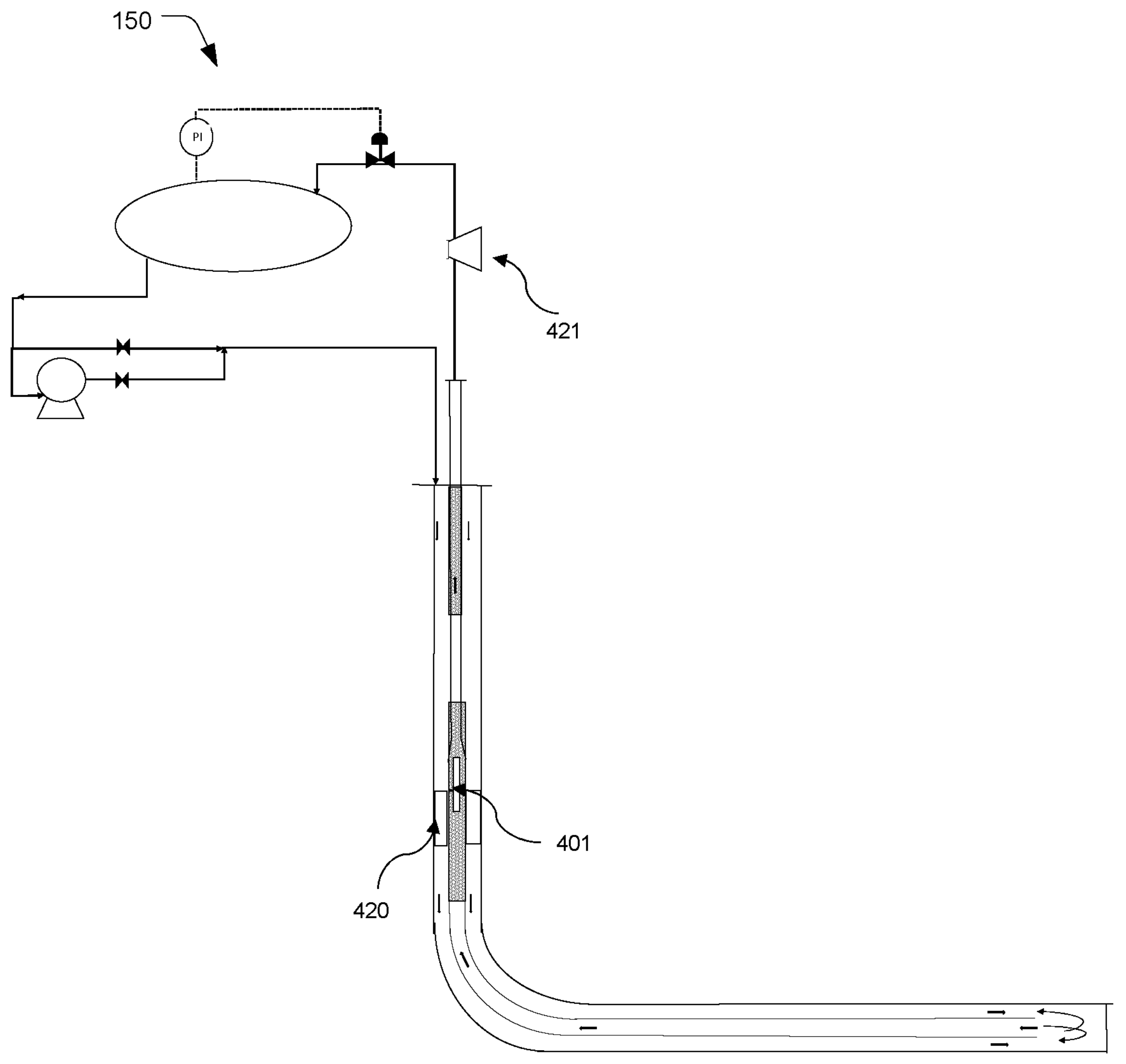

FIG. 3C shows a geothermal power system according to another example embodiment. The system shown in FIG. 3C is generally constructed in the same way as system 400. In the system shown in FIG. 3C, turbine 420 is located in the feed portion and generator 401 is located in the return portion. Generator 401 can also be located in the feed portion with adequate space for the working fluid to flow around generator 401.

Figure 3D:
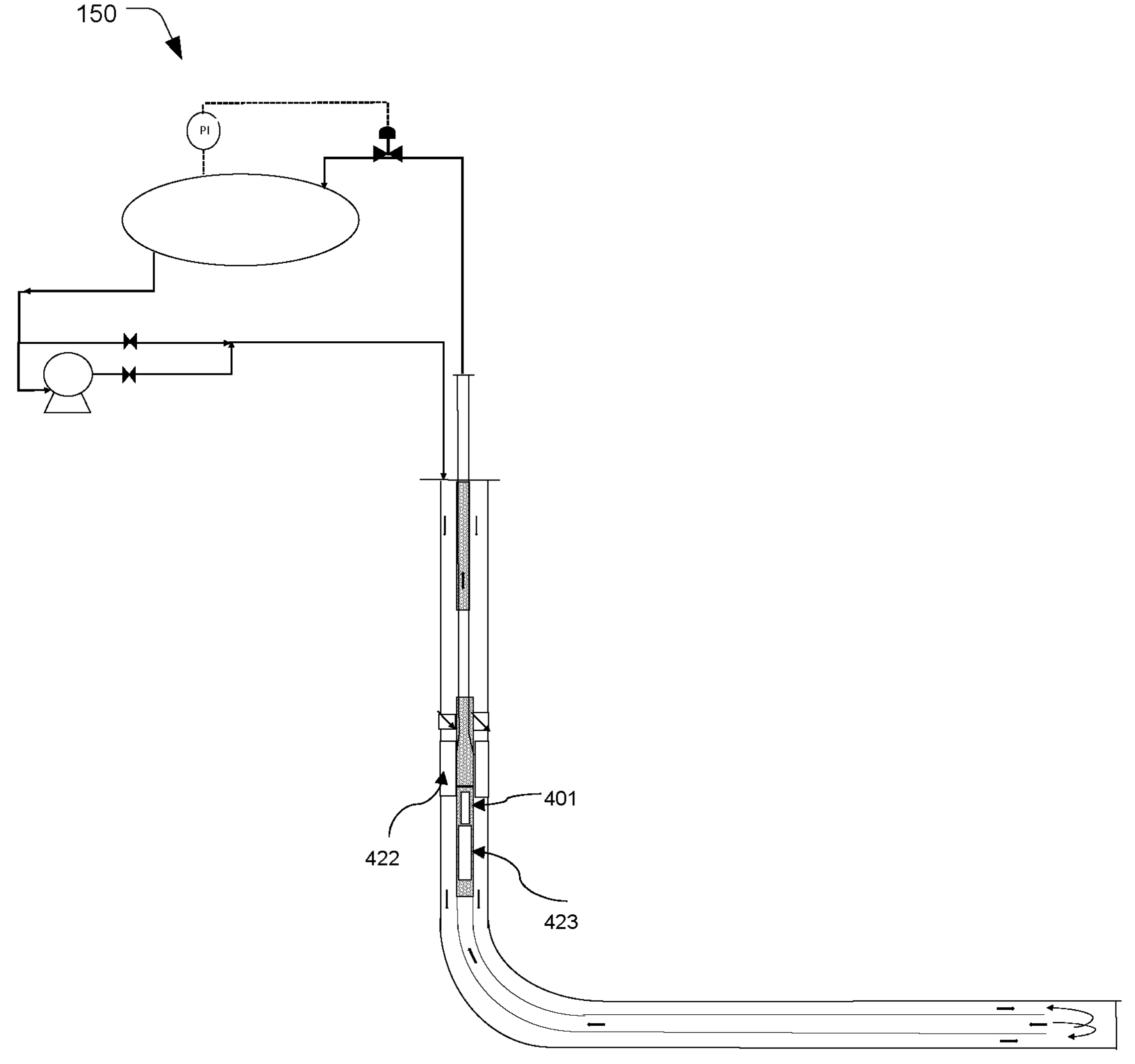

FIG. 3D shows a geothermal power system according to another example embodiment. The system shown in FIG. 3D is generally constructed in the same way as system 400. In the system shown in FIG. 3D, turbine 422 is located in the feed portion and generator 401 is located in the return portion. Generator 401 can also be in the feed portion with adequate space for the working fluid to flow around generator 401.

Figure 4:
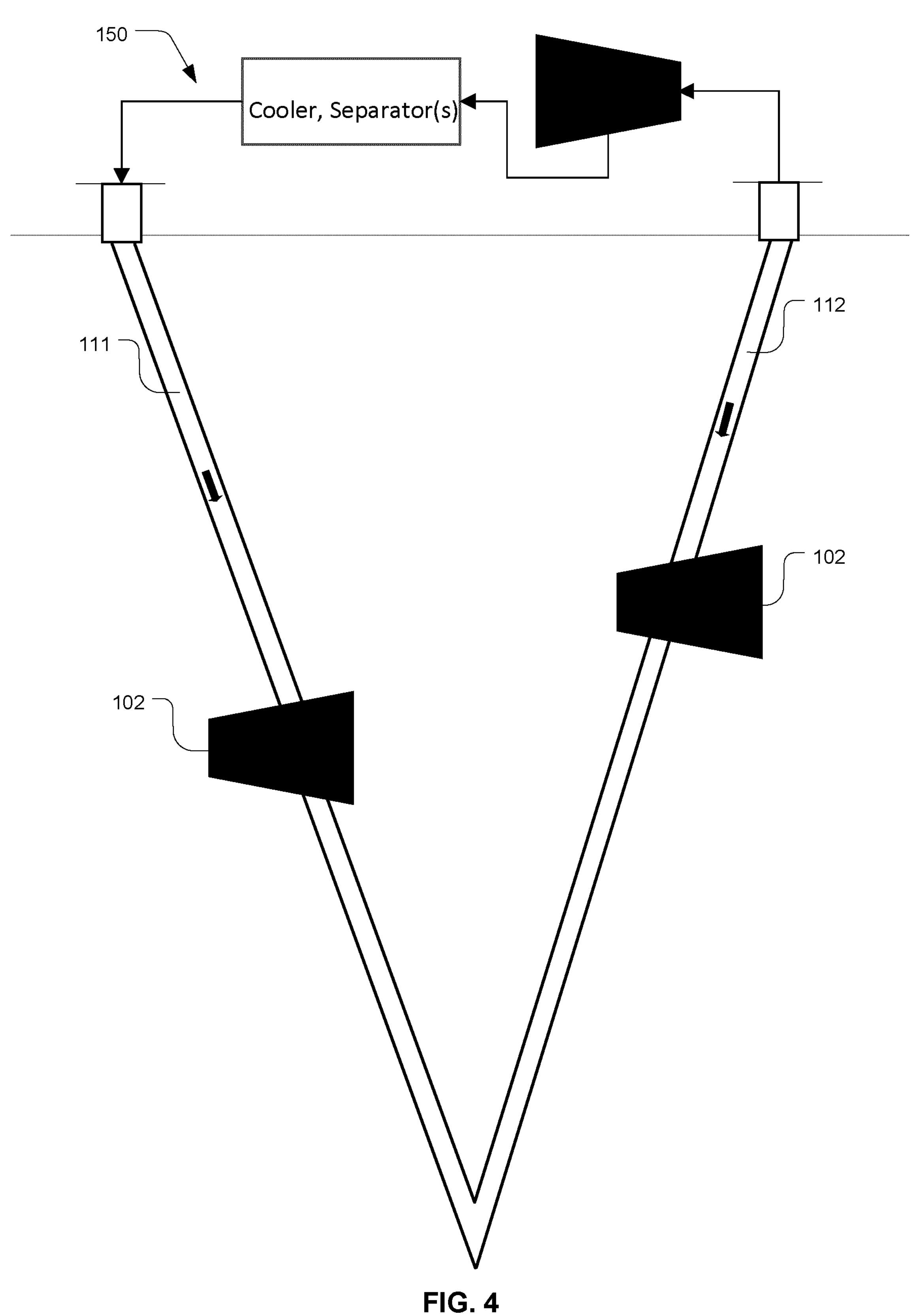
FIG. 4 is a schematic view of an example embodiment of a geothermal power system used in an example well configuration.

FIG. 4 shows a geothermal power system according to another example embodiment. In this embodiment, the wellbore extends between two separately drilled wells that intersect in the subsurface. This well bore can be created by drilling two dedicate wells into a known geothermal resource, or repurposing one well and drilling a second well to intersect the first well in the subsurface.

Thermodynamics

Some embodiments of the present technology takes advantage of an enhanced geothermal power cycle (i.e., a thermodynamic process that is applied modification of the organic Rankine cycle) to generate power. This new cycle is applicable to geothermal system or systems with significant vertical separation from heat into and heat out of the system. Illustratively, this cycle can improve the economics, applicability and increase efficiency of geothermal power generation, especially for low enthalpy geothermal applications where the temperature of the reservoir in formation is less than 140° C.

Systems described herein are designed or otherwise configured to form a closed loop geothermal piping system containing at least one downhole turbine coupled to a downhole generator for generating electricity. The turbine(s) may be driven downhole at least in part by heat energy harvested from formation (i.e., geothermal energy) and/or the gravitational potential energy of the fluid column. Illustratively, systems described herein may be operated in a pre-existing well (e.g., a depleted or inactive multi fractured hydraulically fractured oil and gas well, typical of shale development, where the geothermal resource has previously been insufficient to justify development), do not need to use a pump in normal operation, and/or can increase the pressure of the working fluid to higher levels compared to traditional waste heat systems that generate electricity from above surface. For example, systems described herein may increase the pressure of the fluid to a super critical state and/or heat the fluid once it reaches the horizontal portion of the well, which is at the maximum well temperature. The pressure of the working fluid, and hence the gravitational potential energy of the system, is a function of the depth of the well.

The enhanced geothermal power cycle has minimal parasitic energy loss (i.e., loss due to mechanically adding pressure to the system) compared to a Rankine cycle. In a normal Rankine cycle, the amount of energy generated is as follows:

Electrical Energy Generated=(Geothermal Energy Extracted)*(efficiency of conversion to electricity)−(Electrical Energy of pump)*(efficiency of conversion to pressure).

In contrast, the amount of energy generated in the enhanced geothermal cycle is as follows:

Electrical Energy Generated=(Geothermal Energy Extracted)*(efficiency of conversion to electricity)+(Potential Energy of Cool Fluid Column)*(efficiency of conversion to electricity).

Rather than expending energy to increase the pressure of the working fluid, systems described herein take advantage of the natural pressure increase after the condensation on surface or top of the cycle.

Figures 5A, 5B:
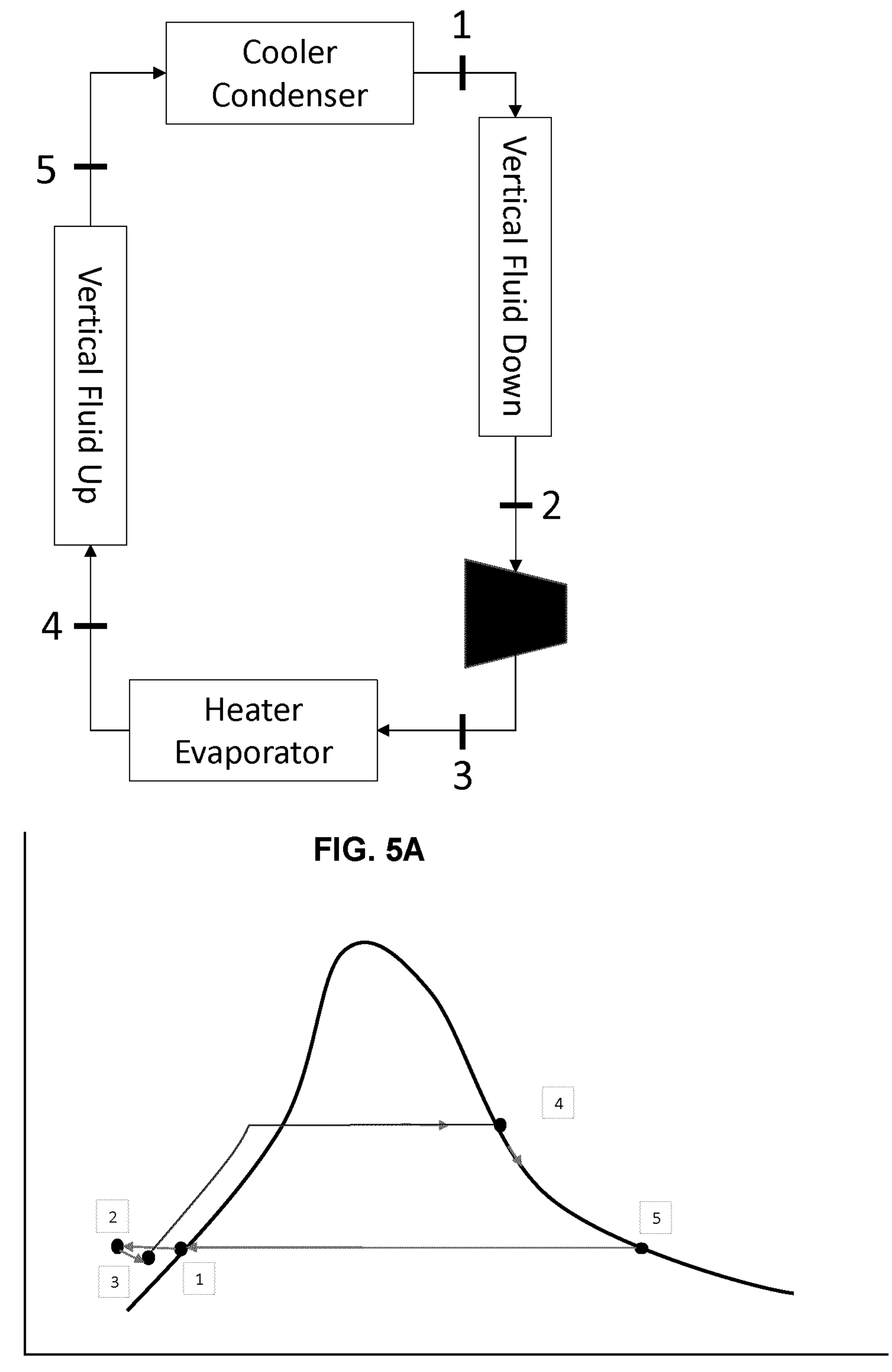
FIG. 5A is a block diagram of an example embodiment of an ideal geothermal power system.
FIG. 5B is a corresponding temperature and entropy diagram of the FIG. 5A system.

FIG. 5A is a block diagram of an ideal geothermal power system that forms the basis of the other power systems described herein. At Point "1", the working fluid is in its liquid phase at the lowest pressure in the system. At Point "2" at the bottom of the fluid column, the fluid has increased in pressure due to gravity. The fluid passes through a turbine before reaching Point "3", where the pressure is reduced as it enters the heater/evaporator. At Point "4" the fluid is vaporized or sufficiently heated to lower its density. The fluid then ascends up the vertical portion due to the thermosyphon effect until it reaches Point "5". After Point "5" the fluid enters the cooler/condenser before it returns back to Point "1".

FIG. 5B shows the temperature entropy diagram corresponding to the process described above in relation to the system shown in FIG. 5A. In essence, the cycle is a density engine, where the net difference in density between two columns within a single closed loop system drives a turbine due to the gravitational potential energy of the fluid (e.g., depending on the net head available). This is not considered a waste heat cycle, but a cycle designed to exploit the temperature difference between two points separated by a vertical distance. The cycle does not require a pump. Instead, the cycle is driven by gravity and the thermosyphon effect. In the ideal case described above in relation to FIGS. 5A and 5B, the fluid is not heated prior to passing through a turbine. The fluid is heated downstream of the turbine to vaporize as a modified Rankine cycle or to significantly lower the density as a modified Brayton cycle. In the ideal case, the maximum temperature of the system is downstream of the turbine. The fluid condenses at the top of the cycle. In the ideal case, there is no heat transfer between the bottom and top of the cycle and the fluid is not superheated.

Applications of the FIG. 5A process include geothermal resource exploitation, or possibly waste heat recovery off a tall building. The efficiency of the cycle varies with height of the system for a given flow rate. The cycle is suitable for low enthalpy geothermal resources. In systems described herein, there is little to no preheating of the fluid flowing down the wellbore (e.g., in a coaxial setup, the flow down would be through highly insulated tubing, and the flow up would be in the annular space in thermal contact with formation) and some heat exchange with formation as the fluid flows up the wellbore. If the thermal profile of the fluid is similar to the geothermal gradient, only a small amount of heat would be exchanged.

Figure 5C:
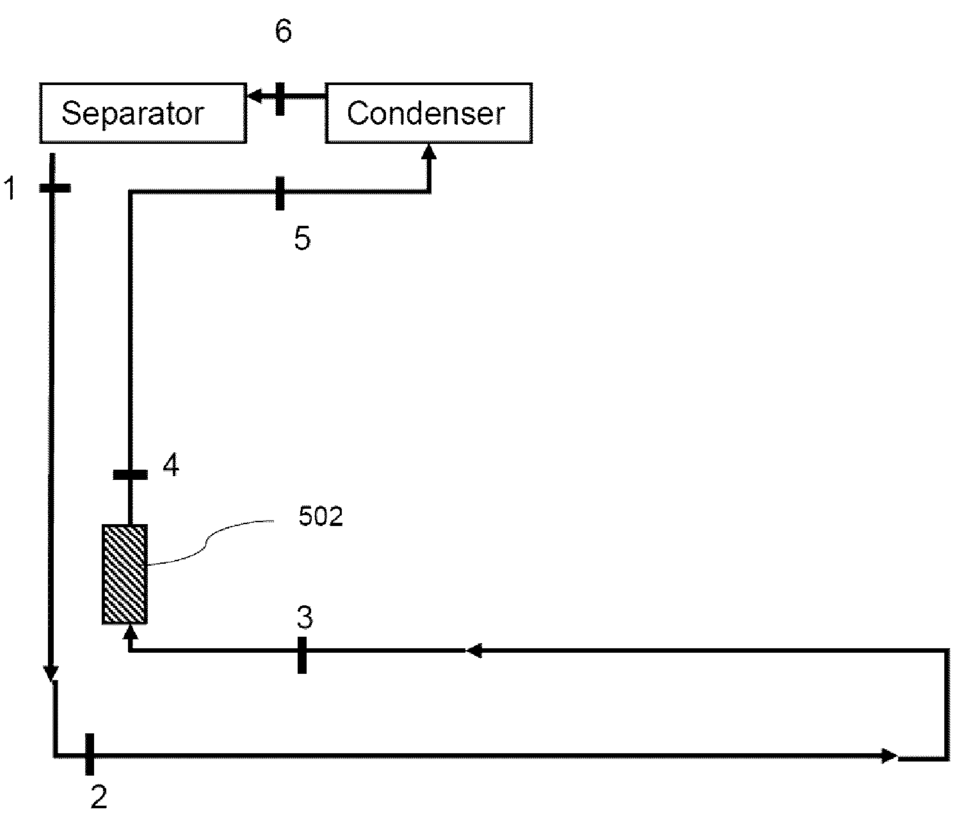
FIG. 5C is a block diagram of an example embodiment of a geothermal power system.

FIG. 5C is a block diagram of a geothermal power system according to an example embodiment. The system shown in FIG. 5C is similar to system 100 shown in FIG. 1A. Like turbine 102 in FIG. 1A, turbine 502 is located in the path of the return flow of the working fluid and positioned near the bottom of the vertical portion of the well and above the heel and horizontal portion.

Figure 5D:
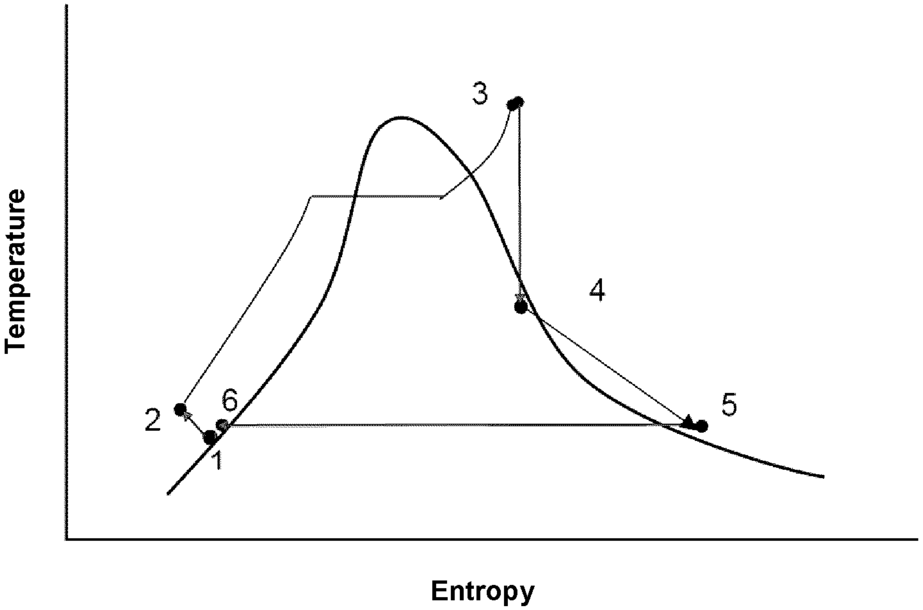
FIG. 5D is a corresponding temperature and entropy diagram of the FIG. 5C system.

FIG. 5D shows the temperature entropy diagram of an example geothermal power cycle corresponding to the FIG. 1A system. In FIG. 5D, Point "1" corresponds to the injection of the working fluid into the channel (i.e., natural flow due to gravity and/or possibly the Venturi effect) where the temperature is low and the fluid is in its liquid phase. Point "2" corresponds to the heel of the horizontal well where some heating has occurred as the fluid descends down the vertical section of the well. Point "3" corresponds to a point in the return portion of the channel where the fluid is at its maximum temperature. As depicted in FIG. 5D, the working fluid is heated by the formation between Point "2" and Point "3" and incurs a pressure drop as a result of flowing to the toe and back to the heel. There is an overall increase in temperature and entropy between Point "2" and Point "3". The fluid undergoes a phase change from liquid to gas. Finally, fluid in its gas phase is further heated to a supercritical state, corresponding to a rapid increase in temperature. The pressure of the gas phase fluid may decrease as the fluid returns towards the surface. Therefore the fluid may switch from a supercritical fluid to a gas as a result of the decreasing pressure (i.e., an endothermic process). Between Point "3" and Point "4", the fluid passes through a subsurface turbine generator to generate electricity. Point "4" corresponds to a point in the return portion of the channel that is past the turbine, where the fluid has passed through the turbine and incurred a sudden pressure and temperature drop. Point "5" corresponds to surface, where the gas has cooled down to become a saturated gas. Point "6" is after the fluid has passed through a condensing stage, where the saturated gas has been converted back into a liquid. As illustrated in FIG. 5D, the condensation can occur at a constant temperature corresponding to the boiling point of the working fluid at the surface pressure. A separator separates the liquid from the gas to return the liquid fluid to Point "1" for re-injection down the wellbore.

Figure 5E:
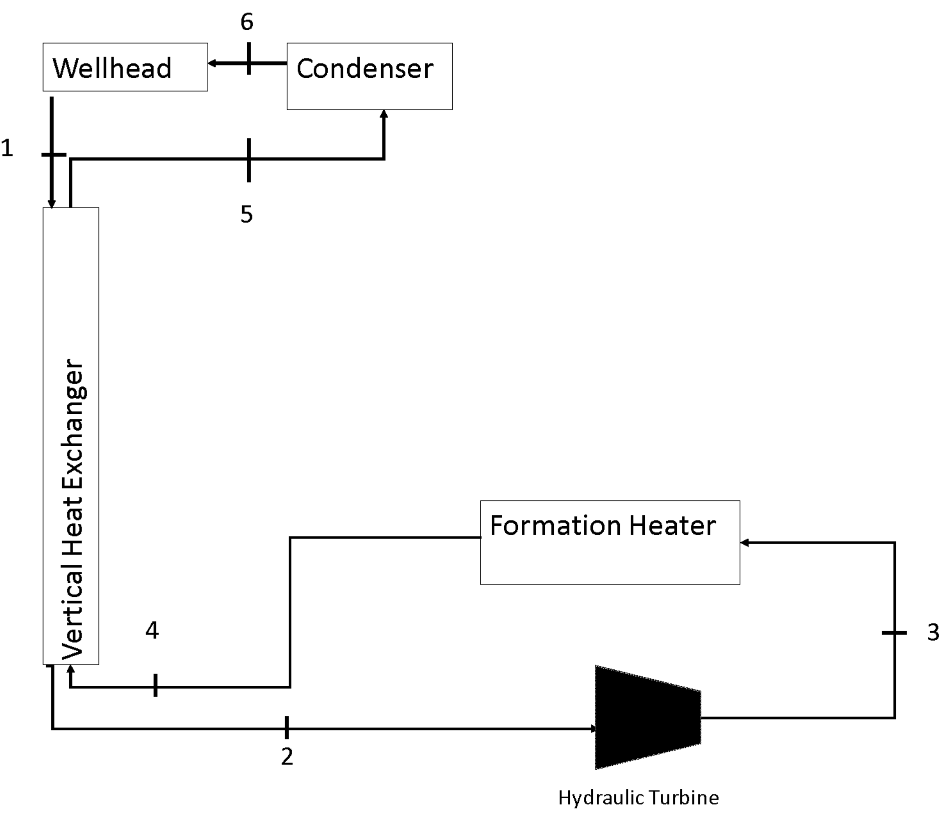
FIG. 5E is a block diagram of another example embodiment of a geothermal power system.
Figure 5F:
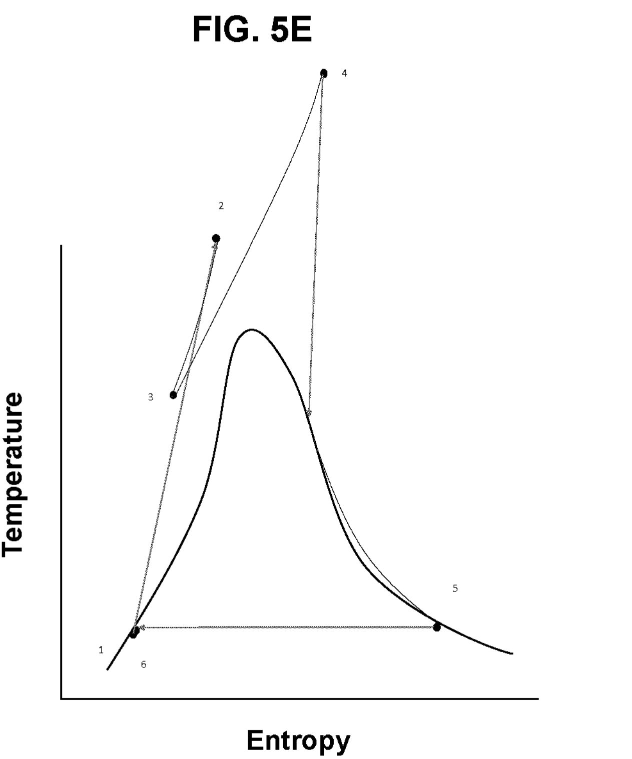
FIG. 5F is a corresponding temperature and entropy diagram of the FIG. 5E system.

FIG. 5E is a block diagram of a geothermal power system according to another example embodiment. In this example embodiment, the density difference between the return and feed portion drives the power generation. The process may be applicable to systems of the type shown in FIG. 3B. The system shown in FIG. 5E includes a hydraulic turbine located in the path of the feed flow of the working fluid. The hydraulic turbine can generate electricity from flow of working fluid caused by gravitational potential energy. The maximum temperature of the system is downstream of the turbine. The primary purpose of the harvested geothermal energy is to change the density of the working fluid and/or drive a thermosyphon to return the working fluid to surface. Some of the geothermal energy may be exchanged between working fluids flowing in the vertical feed and return portions to preheat the feed flow FIG. 5F shows the temperature entropy diagram of the FIG. 1C system. In FIG. 5F, Point "1" corresponds to the injection of the working fluid into the channel (i.e., natural flow due to gravity and/or possibly the Venturi effect) where the temperature is low and the fluid is in its liquid phase. Point "2" corresponds to the bottom of the vertical section of the well where some heating has occurred as the fluid descends down the vertical section of the well. Point "3" corresponds to a point in the feed portion of the channel that is past the hydraulic turbine, where the fluid has passed through the turbine and incurred a sudden pressure and temperature drop. Point "4" corresponds to the toe of the horizontal well where further heating has occurred as the fluid flows through the return portion and is ready to ascend back through the horizontal and up the vertical section of the well. Point "5" corresponds to the surface, where the gas has cooled down to become a saturated gas. Between Point "4" and Point "5", the temperature of the working fluid undergoes a temperature and pressure drop as it flows back to the top of the system. The temperature drop may be caused by one or more of the following: (i) heat exchanged with the working fluid flowing down; (ii) heat rejected to formation 129 if the fluid temperature is higher than the temperature of formation 129; and (iii) heat exchange due to the Joules Thompson effect, where the lowering of the pressure and/or phase change of the fluid absorbs energy of the surroundings. Point "6" is after the fluid has passed through a condensing stage, where the saturated gas has been converted back into a liquid.

Figure 5G:
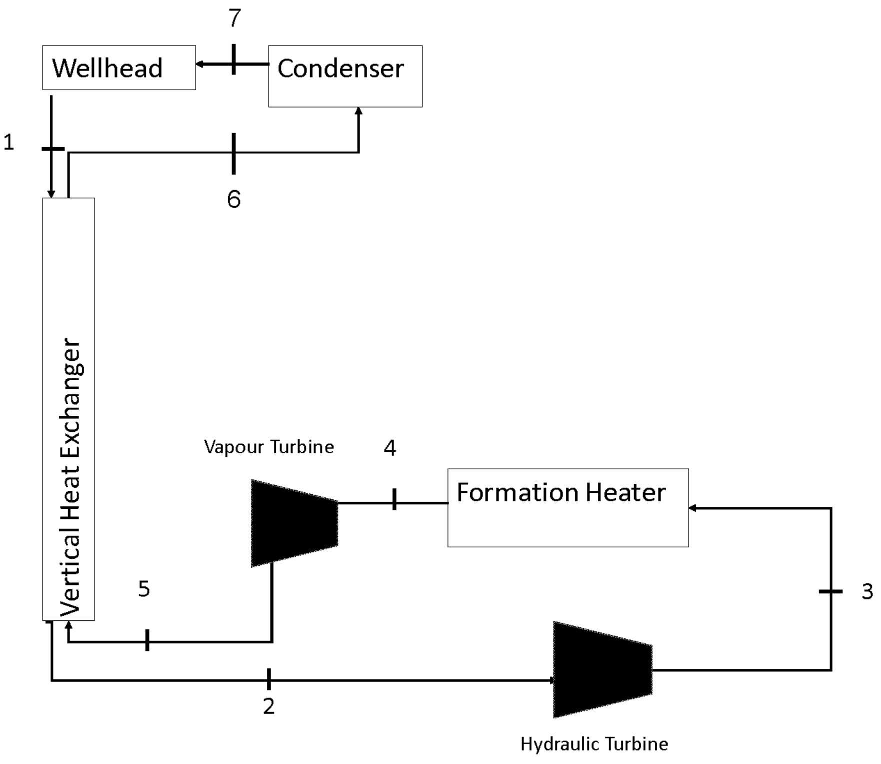
FIG. 5G is a block diagram of another example embodiment of a geothermal power system.

FIG. 5G is a bock diagram of a geothermal power system according to another example embodiment. The system shown in FIG. 5G is similar to a combination of system 400 shown in FIG. 4 and system 200 shown in FIG. 2A. The system shown in FIG. 5G includes a hydraulic turbine located in the path of the feed flow of the working fluid and a gas turbine located in the path of the return flow of the working fluid. Both the hydraulic turbine and the gas turbine are positioned at the horizontal portion of the well in the system shown in FIG. 5G.

Figure 5H:
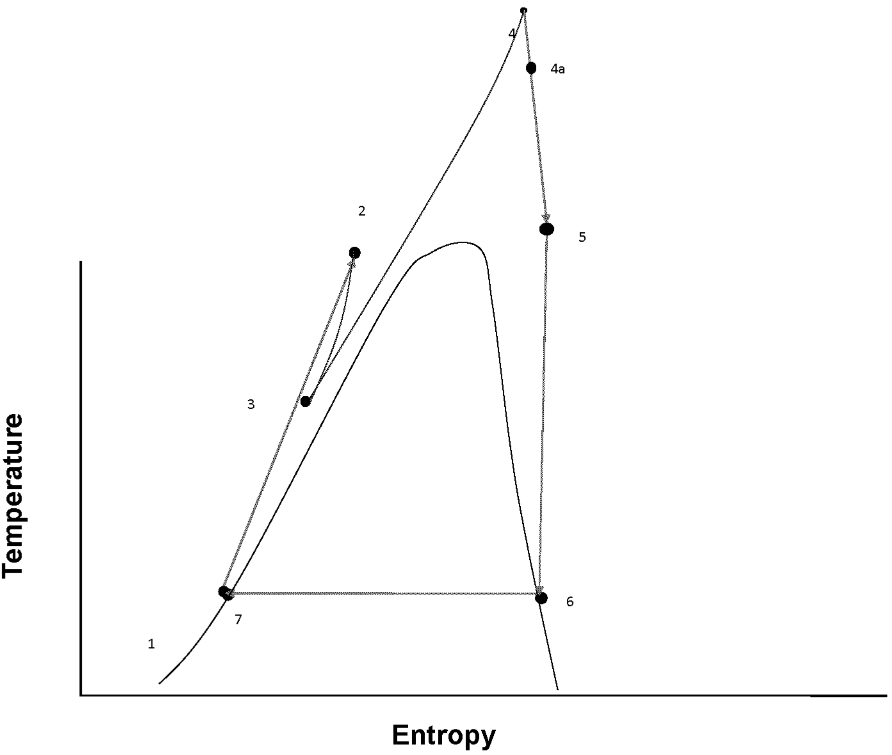
FIG. 5H is a corresponding temperature and entropy diagram of the FIG. 5G system.

FIG. 5H shows the temperature entropy diagram of the FIG. 1G system. In FIG. 5H, Point "1" corresponds to the injection of the working fluid into the channel (i.e., natural flow due to gravity and/or possibly the Venturi effect) where the temperature is low and the fluid is in its liquid phase. Point "2" corresponds to the heel of the horizontal well where some heating has occurred as the fluid descends down the vertical section of the well. Point "3" corresponds to a point in the feed portion of the channel that is past the hydraulic turbine, where the fluid has passed through the turbine and incurred a pressure and temperature drop. Point "4" corresponds to the toe of the horizontal portion of the channel where further heating has occurred as the fluid flows through the return portion and is ready to ascend back up the vertical section of the well. Point "4a" is directly before the vapour turbine. Point "5" corresponds to the heel portion of the channel that is past the vapour turbine, where the fluid has passed through the turbine and incurred a second pressure and temperature drop. Point "6" corresponds to the surface, where the gas has cooled down to become a saturated gas. Point "7" is after the fluid has passed through a condensing stage, where the saturated gas has been converted back into a liquid.

Illustratively, the fluid composition may be varied to create the enhanced geothermal power cycles described above. That is, the composition of the working fluid can be carefully selected and/or fine-tuned to allow for the fluid to condense to a liquid at surface when cooled, flow down as a liquid, vaporize in the horizontal section of the well, pass through a turbine to operate an electric generator, and flow back up to the surface as a gas. By incorporating two vertical fluid flow channels that facilitate heat transfer at relatively constant pressure (minus loses due to friction) between the top and bottom of the channel within the same closed loop system, systems described herein can passively induce phase changes to the working fluid flowing therethrough to drive turbines that operate electric generators located downhole. Systems described herein are designed to accommodate sufficient heat influx downstream of the turbine(s), where the maximum temperature within the system is attained, such that the working fluid vaporizes (or heats up sufficiently resulting in a much lower density) in the return portion of the channel as it makes its way back up to the surface. By utilizing a compressible fluid, instead of water, in a closed loop hydroelectric cycle, systems described herein can generate electricity from the gravitational potential energy of the fluid descending down a wellbore and rely on the geothermal energy downhole to return the fluid to surface. This can be a particularly effective method of generating electrical from low enthalpy geothermal resources.

Example Application of Enhanced Geothermal Power Cycle

Figure 10:
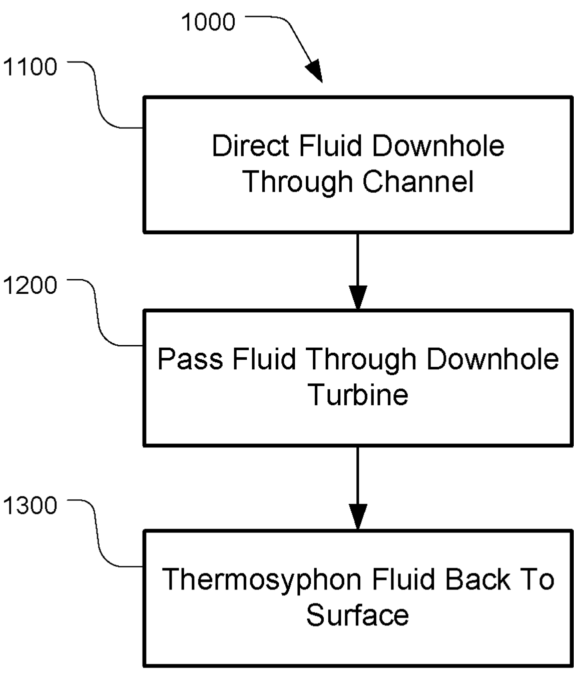
FIG. 10 is a flowchart of an example method of generating power based an enhanced geothermal power cycle.

Various embodiments of the enhanced geothermal power cycle described above have example applications for generating power from a geothermal well. FIG. 10 is a flowchart illustrating an example method 1000 of generating power based an enhanced geothermal power cycle.

Method 1000 begins with directing a working fluid down a continuous downhole channel extending between a feed and a return at surface in block 1100. The working fluid will flow through a first portion of the channel (i.e., a portion relatively proximate to the feed). As the working fluid flows down the first portion of the channel, its temperature and pressure will increase to an intermediate temperature and an intermediate pressure. In some cases, the temperature increase (i.e., the difference between the intermediate temperature and the initial temperature of the fluid) is small before the working fluid passes through a downhole turbine in block 1200. When the fluid passes through the downhole turbine in block 1200, its pressure is decreased and power is generated from a generator coupled to the turbine. After passing through the turbine in block 1200, the temperature of the working fluid is further increased as the working fluid progresses through a second portion of the channel. For example, the working fluid may absorb heat from formation as it progresses through the second portion of the channel. The second portion of the channel may correspond to a horizontal portion of the well in some cases. The working fluid will reach its maximum temperature in this second portion of the channel (i.e., after it has passed through the turbine). After reaching its maximum temperature, the working fluid is then directed back to surface through a third portion (i.e., a portion relatively proximate to the return) of the channel in block 1300. The working fluid may be directed back to surface through the third portion of the channel due to the thermosyphon effect.

Depending on the configuration of the downhole channel, the number of turbines located in the channel, and/or the locations of the turbine(s), the working fluid may exhibit different behavior as it progresses through the various portions of the channel. For example, the difference between the maximum temperature and the intermediate temperature may be greater than the difference between the intermediate temperature and the initial temperature in cases where the first portion of the channel is thermally insulated from formation. As another example, the working fluid may flow down the first portion of the channel as a liquid phase, and transition to a gas phase at the second portion of the channel before flowing up the third portion of the channel due to the thermosyphon effect. In some embodiments, the working fluid is $N_2O_4$ in the liquid phase and undergoes an endothermic reversible chemical reaction at the second portion of the channel to become $NO_2$ in the gas phase.

A typical organic Rankine cycle will have a flow rate to system volume ratio that is higher than methods and processes employed by systems herein. The flow rate in systems herein will be dictated by the temperature gradient, well diameter, and/or depth, rather than the designed pumped flow rate. The temperature differential will create the thermosyphon effect, of which a portion of the energy in the flowing fluid maybe harvested for electricity. By employing passive convective flow rate as a result of conductive heat transfer, the temperature differential between the deepest part of the well and the surface will vary over time. The system may be configured to control the flow rate to cycle the working fluid through the system multiple times per day (e.g., 10 to 20 times). The flow rate may be low and steady so that the heat transferring through conduction into the horizontal part of the well bore can reach a pseudo steady state with the not only the reservoir, but the working fluid flowing through the channel.

In some cases, systems and methods described herein includes means for increasing the pressure at surface to facilitate condensation. Increasing the back pressure at surface also reduces the overall flow rate, which in turn produces less electricity. A higher pressure might be necessary if the fluid temperature, once cooled, is too high to enable the working fluid to condense.

Some embodiments of systems described herein may be operated to produce up to 500 kW of power. Geothermal power typically cannot be installed economically with such small power output because of the high expenses associated with drilling a well. Likewise, low grade heat reservoirs, like oil and gas reservoirs, are typically lower than a 100° C. in temperature and/or too deep to pump fluid economically back to the surface. The energy required to lift water from certain depths at relatively low temperatures makes traditional geothermal systems uneconomic.

Working Fluid

The present technology generates electricity by circulating a working fluid through a closed loop geothermal system. The working fluid is selected to improve electricity production rather than to bring as much heat as possible to the surface. Accordingly, the heat capacity of the fluid is less important than properties like density, heat of vaporization, and enthalpy of condensation. The working fluid should a fluid that can return to the surface as a gas, a gas with a small amount of entrained liquids that can be lift with the gas rate, or an SCF. The working fluid should be able to condense into its liquid state at surface.

The working fluid may be primarily or entirely an organic fluid. Example organic fluids that are suitable for use as the base composition of the working fluid include, but are not limited to: propane, ethane, methane, $CO_2$, heavier hydrocarbons, refrigerants like R143a, and the like. The downhole geothermal system may use a single fluid in some cases. The single fluid may be a mixture of different chemicals. The mixture is typically miscible in a liquid state. The mixture may be adjusted seasonally or as the geothermal resource depletes to maintain or enhance the function of a closed loop system. Phase change materials may also be included within the closed loop to facilitate condensation and/or vaporization of the working fluid. Other additives may also be included to enhance the phase behavior of the working fluid.

In some embodiments, the working fluid comprises one or more of: $CO_2$ and $N_2$. In some embodiments, the working fluid comprises one or more of: methane, ethane, propane, butane and pentane. In some embodiments, the working fluid comprises methanol. In some embodiments, the working fluid comprises non-aqueous materials. In some embodiments, the working fluid comprises $CO_2$ with one or more hydrocarbons (methane, ethane, propane and butane). In some embodiments, the working fluid comprises one or more of: Ethylene, Ethene, Ethyne, Propylene, Propene, Fluoroethane, Methyl formate, Benzene, Dimethyl ether, Toluene, R22, R123, R125, R134a, Isobutane, Methylamine, Helium, $CH_3Cl$, $CHCl_3$, $CH_3F$, $CHFCl_2$, R-1132a, R-13B1, R-12B2, or a mixture thereof. In some embodiments, the working fluid comprises one or more of: $N_2$, $NO_2$, $N_2O_4$, $N_2O$, $NH_3$, $SO_2$, SO, $SO_3$, $O_2$, or other known refrigerants or refrigerant mixtures, including a mixture thereof. For example, the working fluid may be or include a refrigerant that undergoes a reversible chemical reaction as it circulates through the system. The refrigerant's equilibrium point will shift based on surface conditions compared to downhole conditions. In some embodiments, the working fluid comprise a combination of any of the foregoing substances.

In some embodiments, the working fluid is an aqueous solution. In some embodiments, the working fluid is at most 5% water by weight.

In some embodiments, the working fluid is a gas at downhole temperature and pressure (i.e., the temperature and pressure at the toe of the well), and a liquid at surface temperature and pressure. In some embodiments, the working fluid is a supercritical fluid at downhole temperature and pressure (i.e., the temperature and pressure at the toe of the well), and a liquid at surface temperature and pressure. For example, the working fluid may be in its liquid phase at a particular liquid temperature between ~20° C. and +20° C. with a corresponding particular liquid pressure less than 5,000 kPa (e.g., at surface). As another example, the working fluid may be in its gas phase at a particular gas temperature less than 150° C. with a corresponding particular gas pressure greater than 4,000 kPa (e.g., downhole). As another example, the working fluid may be in its gas phase at a particular gas temperature of less than 100° C. with a corresponding particular gas pressure of greater than 4,000 kPa. As another example, the working fluid may have a critical pressure of greater than 4,000 kPa. The working fluid need not be in the states indicated across the entirety of the range indicated. The surface pressure may be controlled to ensure that the working fluid may be liquefied at the surface.

Similarly, the downhole pressure may be controlled based on the surface pressure and/or the pressure due to the weight of the fluid. The pressure due to the weight of the fluid may increase at a rate of between 5,000-12,000 kPa/km. For example, if the pressure at surface is 2,000 kPa and the depth of the well is 1.5 km, then the working fluid weight may add a pressure of 10,000 kPa/km so that the pressure downhole would be around 17,000 kPa at the bottom of the well.

In addition to these static pressure considerations, flow rate of the working fluid may also be controlled by adjusting the downhole pressure at particular points within the wellbore (i.e., due to the flow rate itself, changes in cross-sectional area of the channel, and configurations of pumps or turbines that add or remove pressure). This means that the pressure at surface, the flow rate, and the working fluid can be selected so that the working fluid is a liquid at surface and a gas at particular downhole locations within the wellbore.

Fluids that are relatively dense in their liquid phase tend to create more pressure through their gradient as they flow down the channel in the wellbore. Fluids that are relatively dense in their liquid phase also tend to require a higher heat flux in the horizontal portion of the wellbore to heat the fluid to a sufficiently high temperature so that it can vaporize when flowing back to the surface. In addition, the lighter the fluid gravity, the lower the boiling point of the fluid. Lower boiling point means that higher surface operating pressure will be required to condense the working fluid given the available cooling duty on surface.

Different working fluids will result in different mass and volumetric flow rates. Systems described herein can be optimized for power output by selecting the working fluid that provides the highest possible heat influx and density differential between the feed and return channels and the highest mass flow rate given the characteristics of the pre-existing well and associated thermodynamic potential for heat transfer (temp of formation, depth, surface area). The flow rate of the well needs to be sufficiently high to induce the pressure drop that will lead to the predicted behavior, therefore a start-up pump may be required to initiate the thermosyphon. The effect is also balanced by the rate of available heat flux into the well. There may be a design flow range as a result of the surface temperature variation (24 hour and seasonally).

The interdependence of the flow rate, fluid composition, well design parameters, location and number of the turbines, and surface temperature create some redundancy where the system can still operate at a different efficiency even if one of the variables is not exactly at its design point. If it is hot on the surface, which has increased the surface operating pressure, it may be desirable to supply the fluid at a higher rate to help induce enough pressure drop to still permit the generation of electricity. If not, the well can be shut in from surface to stop the fluid flow. This would allow the pressure to build downhole, and provide a possible surge when brought back online.

A downhole valve is one way to provide the energy storage operating mode. Surface fluid storage and volume in the subsurface could also be combined to provide energy storage. Short term energy storage may be achieved by either stopping the flow at up at the top of the well, and allowing the formation to reheat, pressure to build and super heat the working fluid relative to the pseudo steady state temperature, until a maximum is reached, and then the stored energy can be released, creating shorter term power surge that would be above the steady state power output.

Energy storage may increase power output and generation efficiency by allowing the composition of the working fluid to be adjusted seasonally. The cooler it is on surface, the more power can theoretically be generated by the device but could be limited by the fluid composition (e.g., making the fluid lighter with a fluid like ethane in the winter and heavier with a fluid like propane in the summer).

Control

The design will be dictated by the configuration of the well. The characteristics of the well include: total measured depth, total vertical depth, length of horizontal lateral, surface temperature range (daily and seasonal), downhole temperature profile (temperature gradient), heat flux through the formation in the vertical, heat flux in the horizontal lateral, (convective heat transfer within the formation increased as a result of higher permeability channels created by the hydraulic fracture stimulation), inner diameter along the length of the well and previous completion design of the well.

The system will be designed to increase the amount of electricity which can be produced. The system will be designed to minimize any insulation in the well, and minimize surface cooler capacity. For a given well, the design parameters of the system may include one or more of:

- fluid composition;
- influence fluid gradient, vaporization energy required, flow rate;
- fluid pressure gradient down and up, and ratio;
- vaporization energy rate;
- flow rate;
- surface pressure operating range;
- surface temperature minimum;
- surface temperature maximum;
- surface condensation cooling capacity;
- operating mode (continuous or store and release);
- turbine locations;
- number of turbines;
- crossover number and position;
- insulation along the inner passage to control heat transfer between fluids; and
- output capacity factor considering temperature fluctuations.

These parameters can be adjusted to improve and/or optimize one or more of the following parameters:

- amount of heat harvested;
- mass flow rate;
- electrical power output;
- efficiency;
- run time; and
- maintenance schedule.

The composition of the fluid can change the pressure gradient down, which will affect the max pressure in the subsurface and throughout the geothermal piping system. The total amount of flowing pressure available created by the thermosyphon effect controls the rate at which the well flows, and the heat capacity, enthalpy of vaporization and flow rate at which cold fluid is introduced to the heat sink. The flowing pressure is also directly proportional to the heat flux into the geothermal piping system in the horizontal lateral (or heat sink portion of the system), The heat flux is directly related to the amount of electricity produced multiplied by the efficiency of the system. Higher efficiency is not necessarily more electricity.

When vaporizing in the subsurface, the fluid may be at a super critical stage before entering the turbine and/or the expansion valve and therefore never actually vaporize. The density of the super critical fluid relative to the liquid and gas density will help determine if a possible thermosyphon can be established. Controlling the working fluid can be used to control the point at which the supercritical fluid vaporizes.

If a self-maintaining thermosyphon cannot be established for a particular well, a pump can be used to increase the surface pressure on the downside of the casing, to stimulate flow. The pump may be controlled depending on surface conditions. For example, the pump may be used only when the temperature differential between the top and bottom of the well is small. The pump may comprise a surface pump and/or an inline pump that hangs slightly below the surface (e.g., about 10 to 20 meters below surface).

Depending on operating condition (e.g., surface temperature, pressure, etc.) each turbine can be turned on or off independently from one another in some cases. The turbine at the top of the system will be used to control the system in the case of changing temperature on surface and/or to capture excess heat available early in the depletion of the geothermal resource or immediately after a shut in period. As shown in FIG. 6F, this period can last for years, but is also possible over only a couple of hours in response to a brief shut in.

The system may use an expansion valve to passively control the state of the working fluid. The expansion valve may be considered either a static or dynamic choke, which is sized to deliver a certain pressure drop once a minimum rate is attained at start up using the surface pump. As the fluid rate increases during start up, the pressure drop across the choke should eventually be high enough to induce adequate pressure drop to vaporize the working fluid, after which it is reheated and then passed through a turbine. The expansion valve will be in the subsurface, in the downward flowing direction, between the deepest part of the vertical section and the end of the inner tubing. The function of the expansion valve can be provided by a turbine or series of turbines.

Once adequate flow rate is achieved and the system reaches prescribed pressure and temperature operating ranges, or temperature profiles along the length of the well, the start-up pump can shut down, and the flow will be maintained due to the thermosyphon effect. This could take up to 12 hours. The decline of heat is not the prescribed temperature and pressure profiles, but rather the heat transfer within the system from the return to the feed, and pressure drop across all turbines to establish the thermosyphon effect.

Pump may be used during upsets to the system, for store and release operating mode, or to operate outside of the design range.

The turbine is linked to a generator downhole, which is connect by an electric cable to surface. The power in a single turbine set up can be AC or DC. In a multi turbine configuration generating DC power would not require the electricity sources to synchronize to travel in one wire to the surface.

Options

In another embodiment, the systems described herein can be paired with a solar installation with the geothermal unit configured to operate in a store and release operating mode, thereby reducing the need for batteries at a solar site. This embodiment could help to alleviate the duck curve problem that is created by high output of solar in the middle of the day, feeding into the grid. Likewise, the geothermal may operate when the amount of solar energy is low providing complementary energy sources. Intermittent operation of the system will also allow the near wellbore region of the geothermal resource to replenish in heat, increasing the overall power output or making the system economic in lower enthalpy geothermal resources that are currently not considered economic for electricity generation (less than 100° C.).

The store and release operating mode allows for pressure in the subsurface to build above what would be the normal/expected operating pressure. It also allows for the subsurface fluid to heat up due to the formation reheating. It also allows for the fluid, which is compressible, to be pressurized in a similar way to compressed air energy storage. The influx of solar during the day can go to power the pump on surface, which increases the pressure down hole; later in the day after the sun sets, the pressure can be released and converted to energy.

Within the outer passage, there could be a finned metal fixture that extends into the subsurface to help cool and condense the working fluid as it returns to the surface or to help heat the fluid when the surface temperature is below the shallow geothermal resource temperature.

As the fluid descends the outer passage, it may exchanges heat with the wellbore fluid between the reclaimed oil well and the outside of the geothermal piping system. It may also exchanges heat with the fluid flowing up the inner passage. Insulation on the inner passage may be required to limit heat transfer as part of the design.

Crossovers may be included to allow fluid originally in the inner passage to flow in the outer passage and/or fluid originally in the outer passage to flow in the inner passage. Multiple crossovers might help to optimize the design in a well as crossovers may be required so that the fluid in the outer passage can exchange heat with the formation.

In addition to the exemplary aspects described above, the present invention is described in the following Examples, which are set forth to aid in the understanding of the invention, and should not be construed to limit in any way the scope of the invention as defined in the claims which follow thereafter.

EXAMPLES

Simulation studies were conducted by the inventors on systems of the type described herein.

Example 1: Thermal Profile Modeling

Figure 6A:
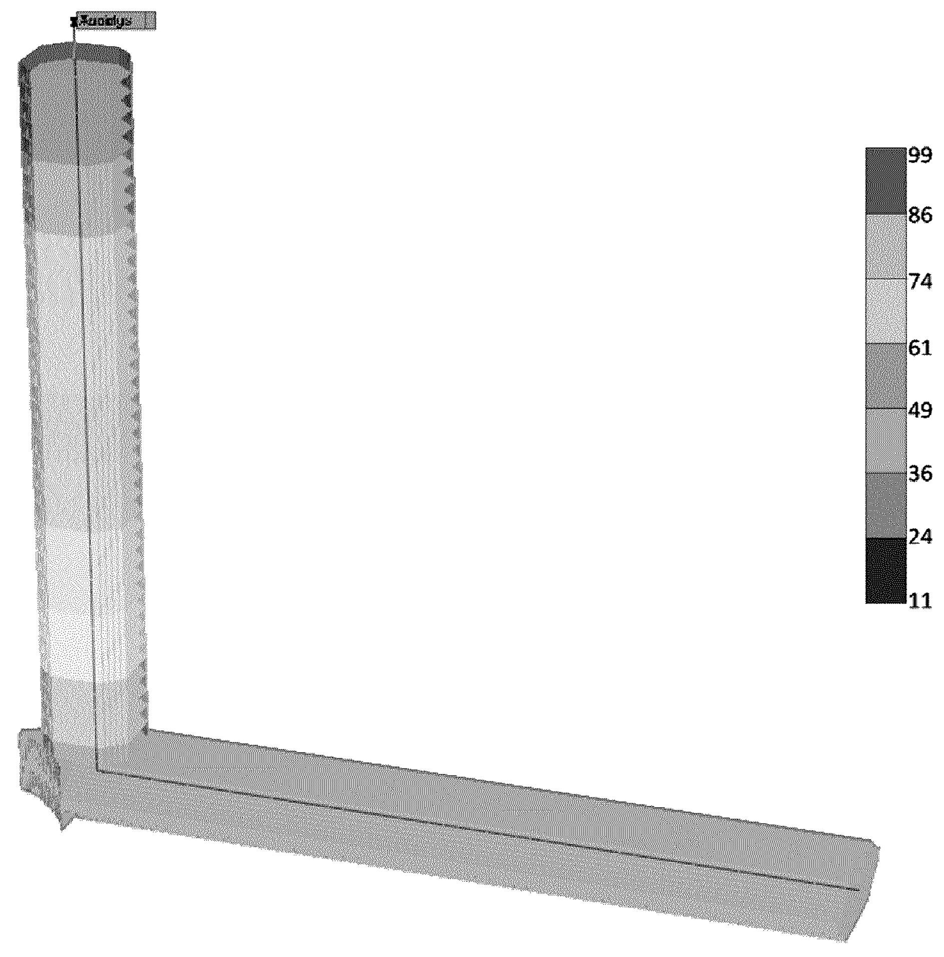
FIG. 6A depicts a thermal reservoir model of a wellbore created in a simulation experiment.

In a first simulation study performed by the inventors, thermal reservoir models were created to predict the heat influx within a horizontal well. FIG. 6A depicts a thermal reservoir model of a wellbore created by the inventors. In the model, the well is ~2500 m deep with a total measured depth of ~3900 m, has an inner diameter of ~150 mm at the vertical portion, and an inner diameter of ~100 mm at the horizontal portion. An outer wall and an inner wall are placed in the well to simulate a coaxial channel. The outer wall has a diameter of ~90 mm in the vertical section and ~55 mm in the horizontal section. The inner wall has a diameter of ~62 mm in the vertical section and ~45 mm in the horizontal section. In the model, the working fluid is pure $CO_2$, the surface injection pressure is 4.5 MPa, the surface injection temperature is 9.87° C., and the maximum downhole temperature is 85° C. in the toe of the well. insulation in provided in the vertical portion but not in the horizontal section.

Figure 6B:
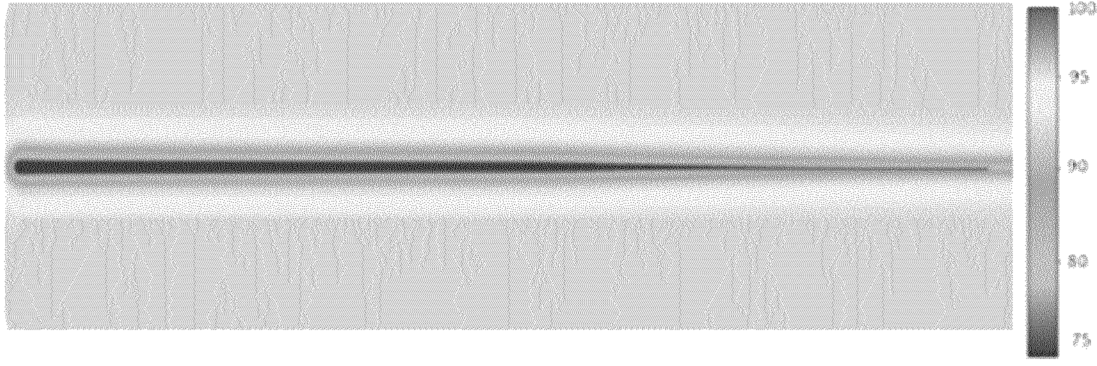
FIG. 6B shows the thermal profile of the wellbore at a cross-section of the horizontal section.

FIG. 6B shows the thermal profile of the wellbore at a cross-section of the horizontal section after an extended period of time (i.e., showing the pseudo steady state of heat harvested by the working fluid, and heat delivered through the reservoir). As shown in FIG. 6B, the temperature is higher closer to the formation and lower closer to the center of the wellbore. The temperature profile is also not symmetrical from one end of the horizontal portion to the other.

Figure 6C:
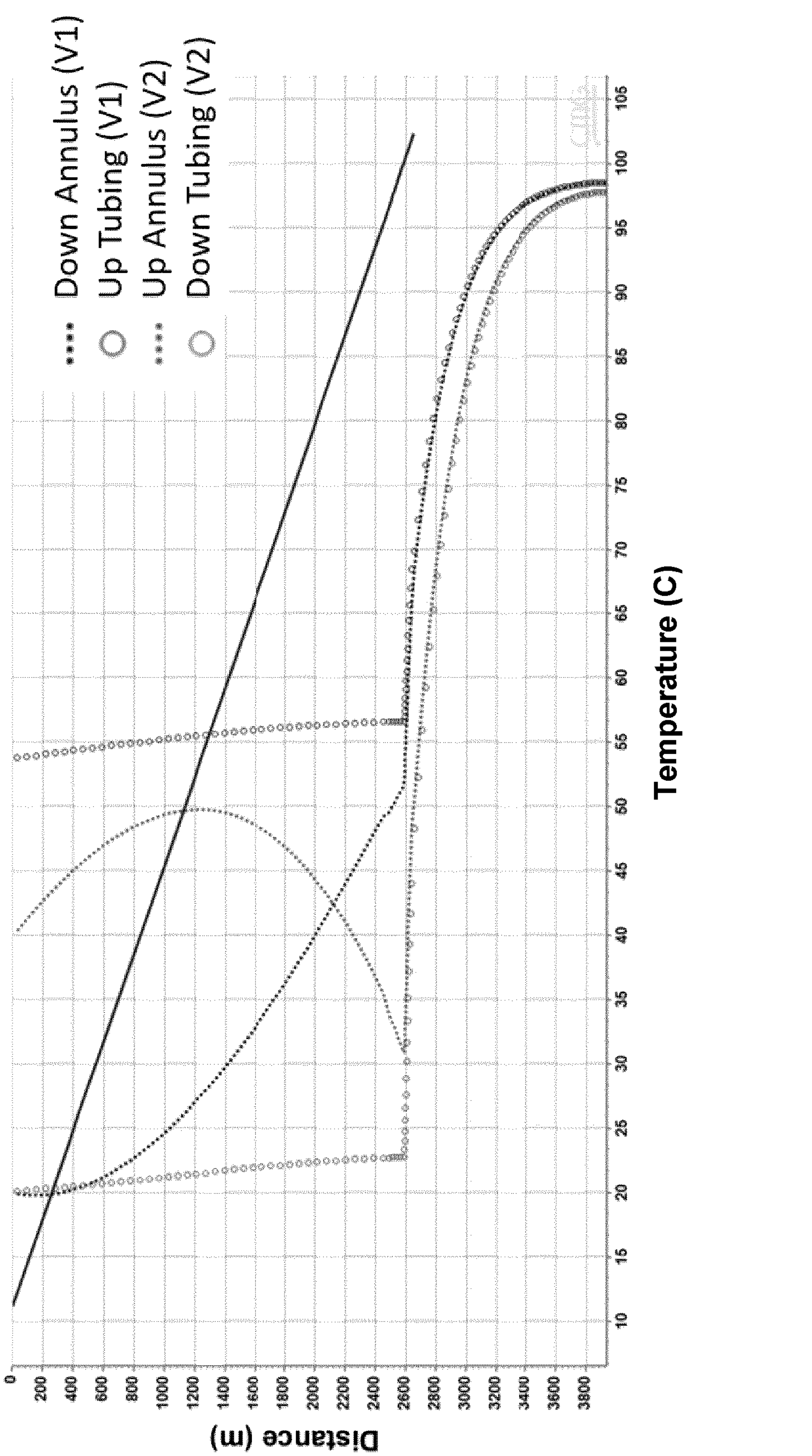
FIG. 6C-E show various results obtained from the simulation experiments performed using the FIG. 6A model.
Figure 6D:
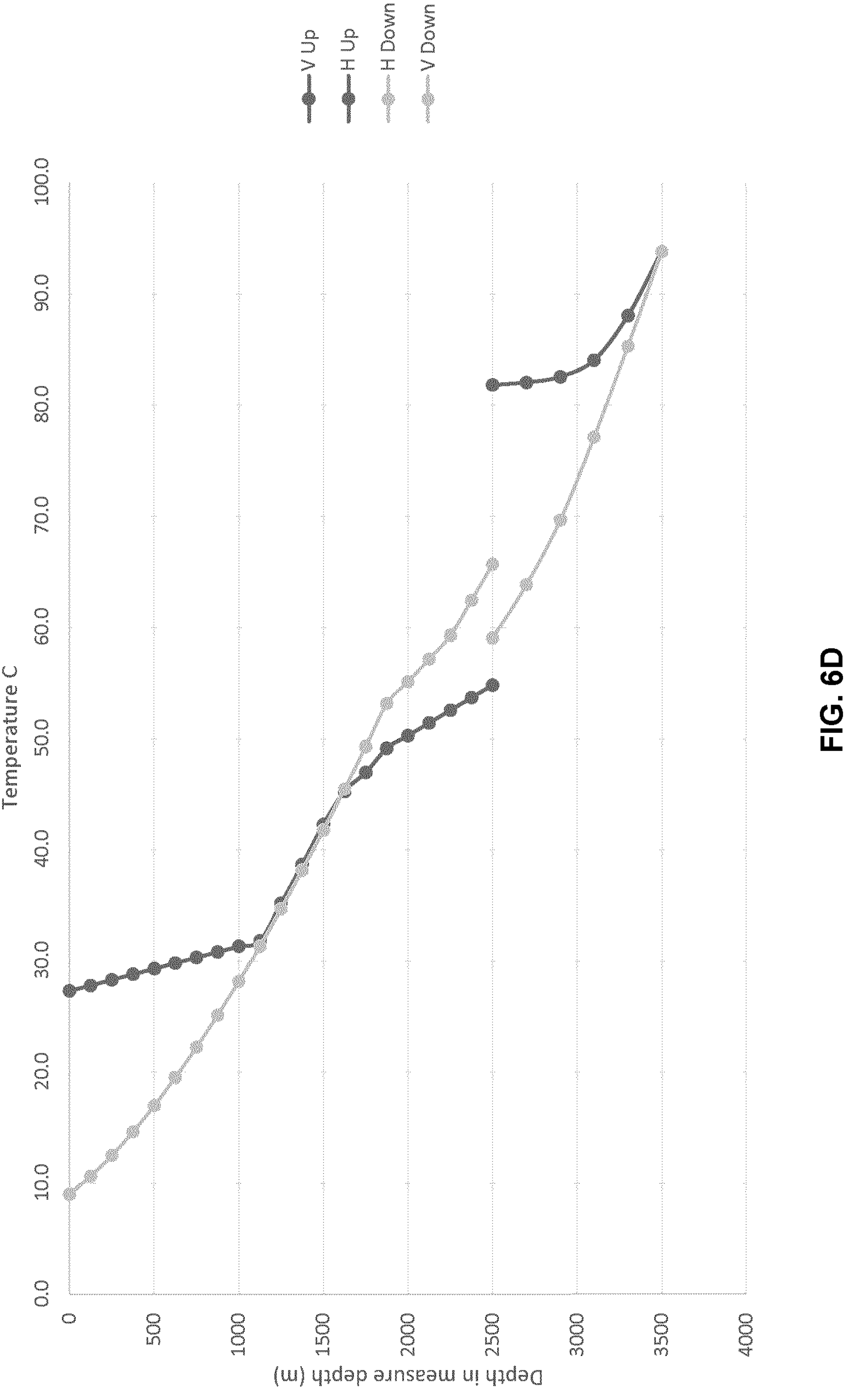
Figure 6E:
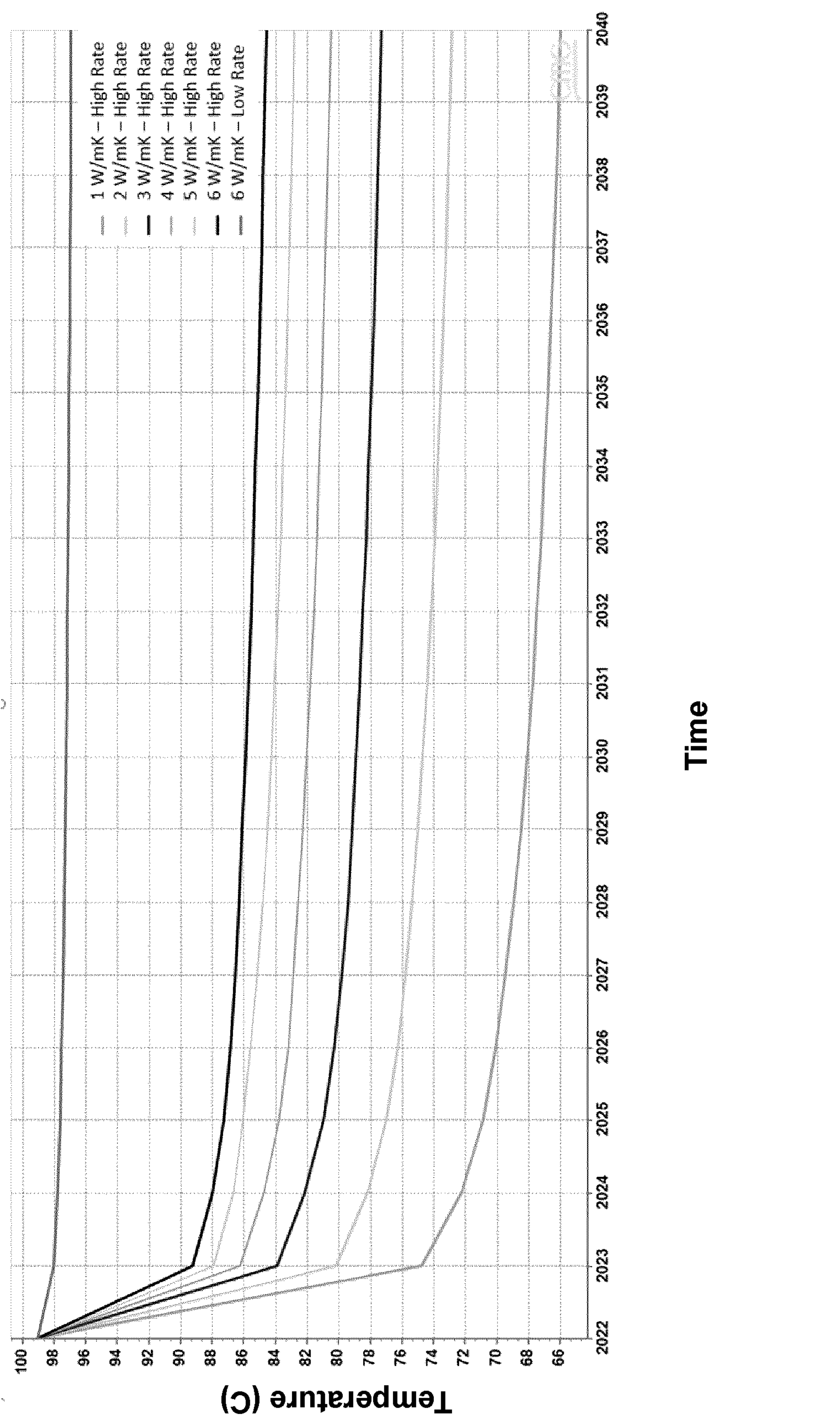

FIG. 6C-E are results from the simulation shown in FIG. 6A. FIG. 6C shows the differing thermal profile of the same system given injection down tubing or injection down annulus. FIG. 6D shows the thermal profile of an example two downhole turbine embodiment (e.g., as depicted in FIG. 4B and representative of the process model in FIG. 7D). As shown in FIG. 6D, the heat transfer between the feed and return channel is relatively fast in comparison to the heat transfer between the formation and the outer wall of the closed loop system. Insulation near the surface prevents the return portion from being over cooled from the feed channel, while the feed channel heats up due to the shallow geothermal resource. Insulation on the inner tubular within 400 m on either side of the turbines allow the fluid to enter the turbine at a higher temperature without being cooled by the other channel. FIG. 6E shows the near wellbore temperature draw down in time for varying formation thermal conductivities. The variation in flow rate affects the temperature drawdown and the amount of heat harvested. In the first year and immediately after start up, the thermal output is higher. Hence, it can be desirable to vary the design flow rate over time.

Example 2: Turbine Configurations

In a second simulation study performed by the inventors, systems of the type described herein were modeled using software to assess the power output of various turbines provided in various configurations of the system. In the simulation studies, cold working fluid was supplied to the channel of various systems at a pressure of 4.5 MPa and a temperature of 9.87° C. The working fluid is pure $CO_2$. The simulated well has the same dimensions as that above for the system simulated in FIG. 6A. The heat transfer into the system is also derived from the thermal profile modelling from FIG. 6A and the same across all studies. Across all studies, the fluid returning to surface is a pure vapour at 4.75 MPa downstream of the surface expander.

Figure 7A:
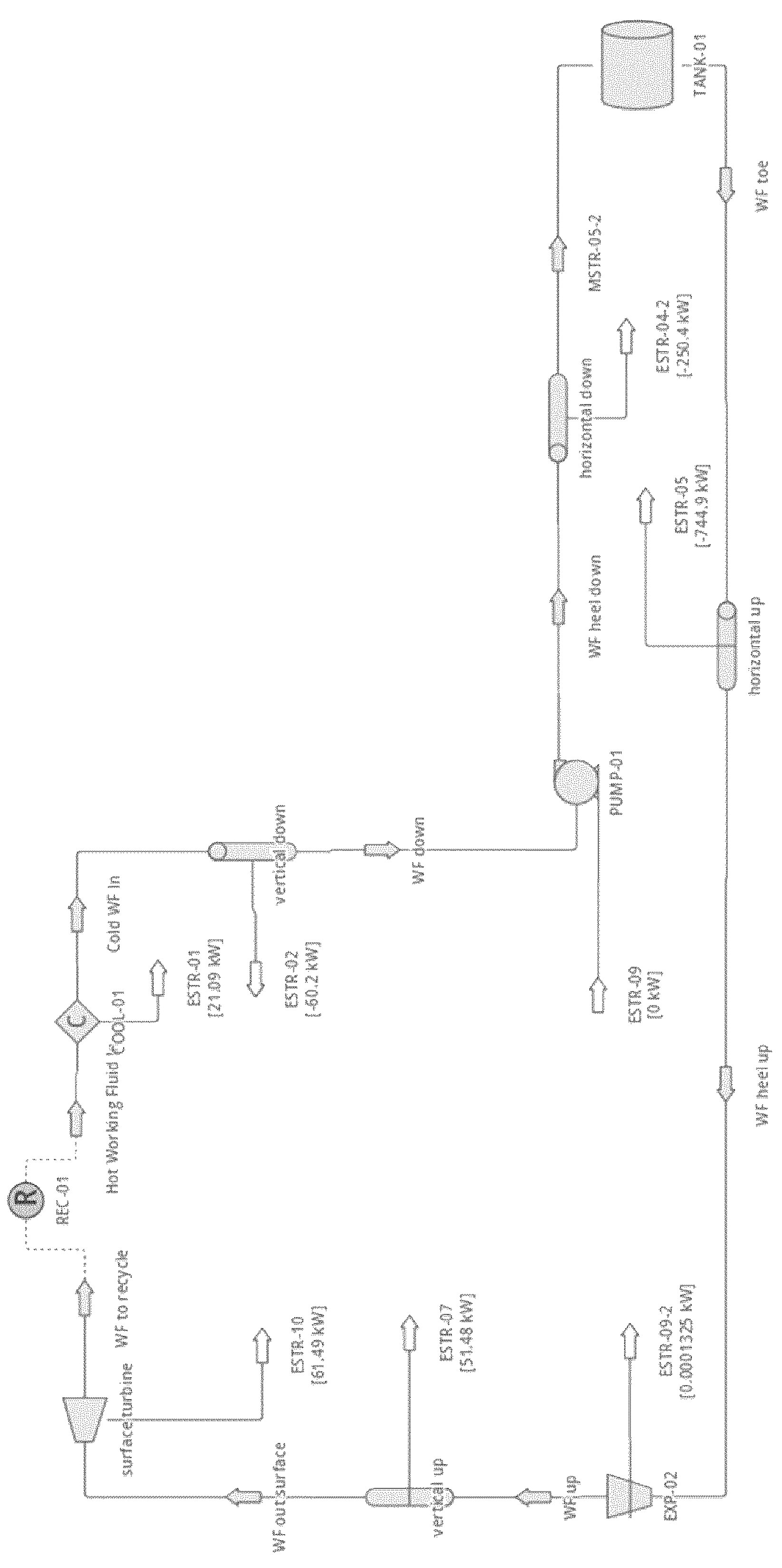
FIGS. 7A-7G depict various example configurations of a geothermal power system that were studied in a simulation experiment on the location and number of turbines used in the system.

FIG. 7A illustrates the configuration of the system in a first simulation. The first simulation was performed on a system comprising a single turbine located above surface. The simulation results showed ~61 kW of power produced at the turbine.

Figure 7B:
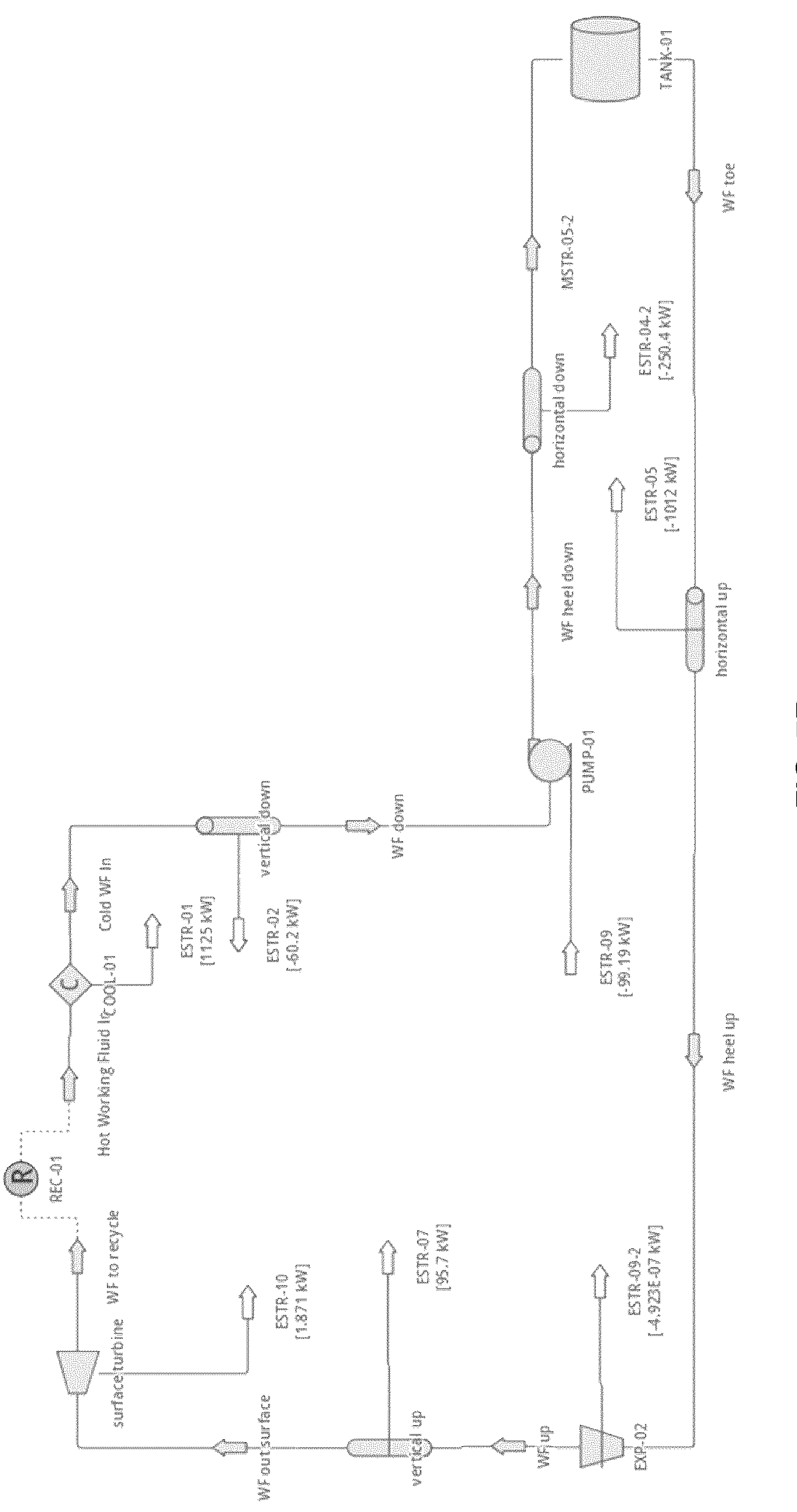

FIG. 7B illustrates the configuration of the system in a second simulation. The second simulation was performed on a system comprising a single turbine located at the vertical feed portion of the channel. The simulation results showed ~100 kW of power produced at the turbine.

Figure 7C:
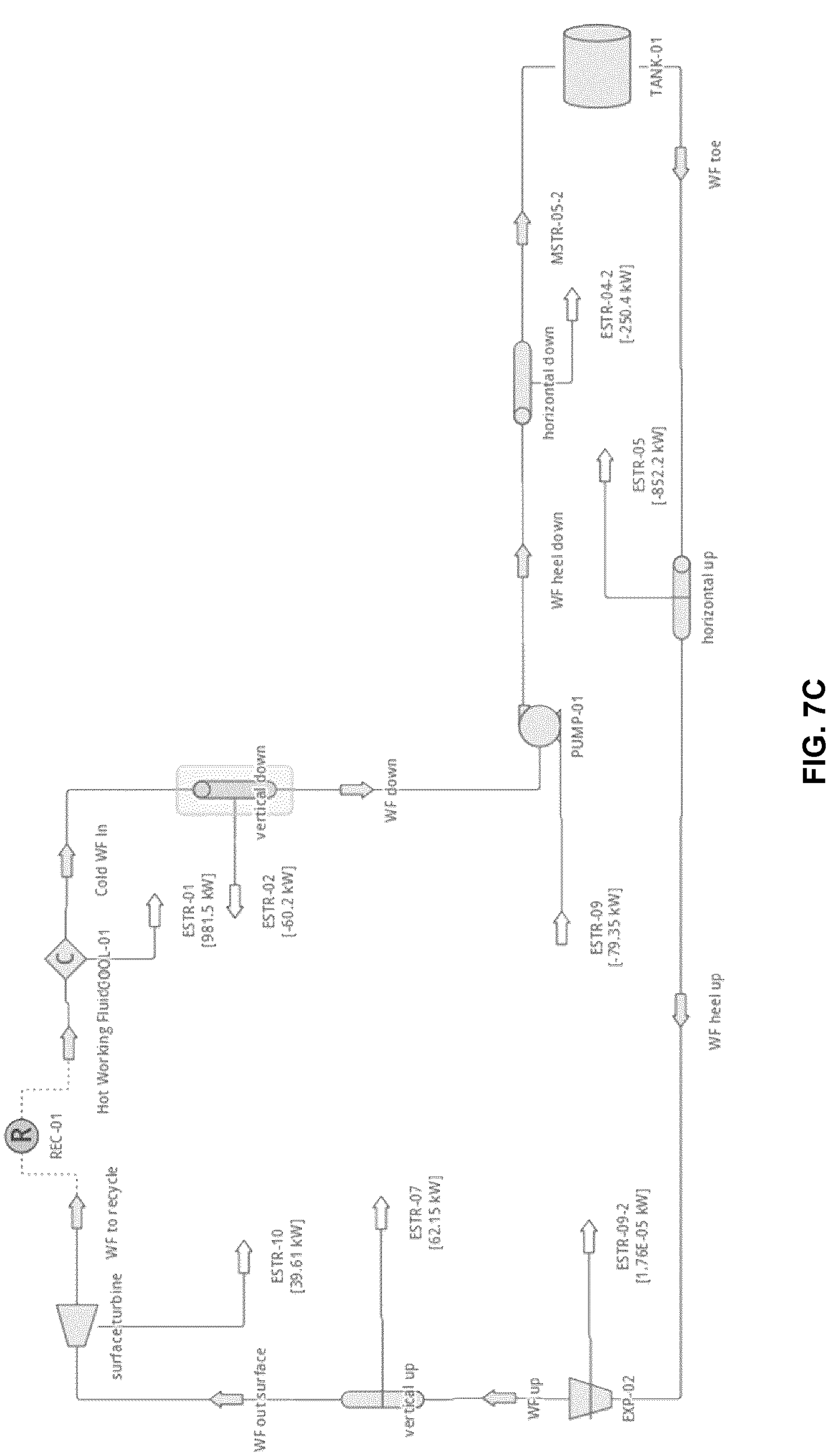

FIG. 7C illustrates the configuration of the system in a third simulation. The third simulation was performed on a system comprising a gas turbine located above surface and a hydraulic turbine located at the vertical feed portion of the channel. The simulation results showed ~79 kW of power produced at the hydraulic turbine and ~45 kW of power produced at the surface turbine.

Figure 7D:
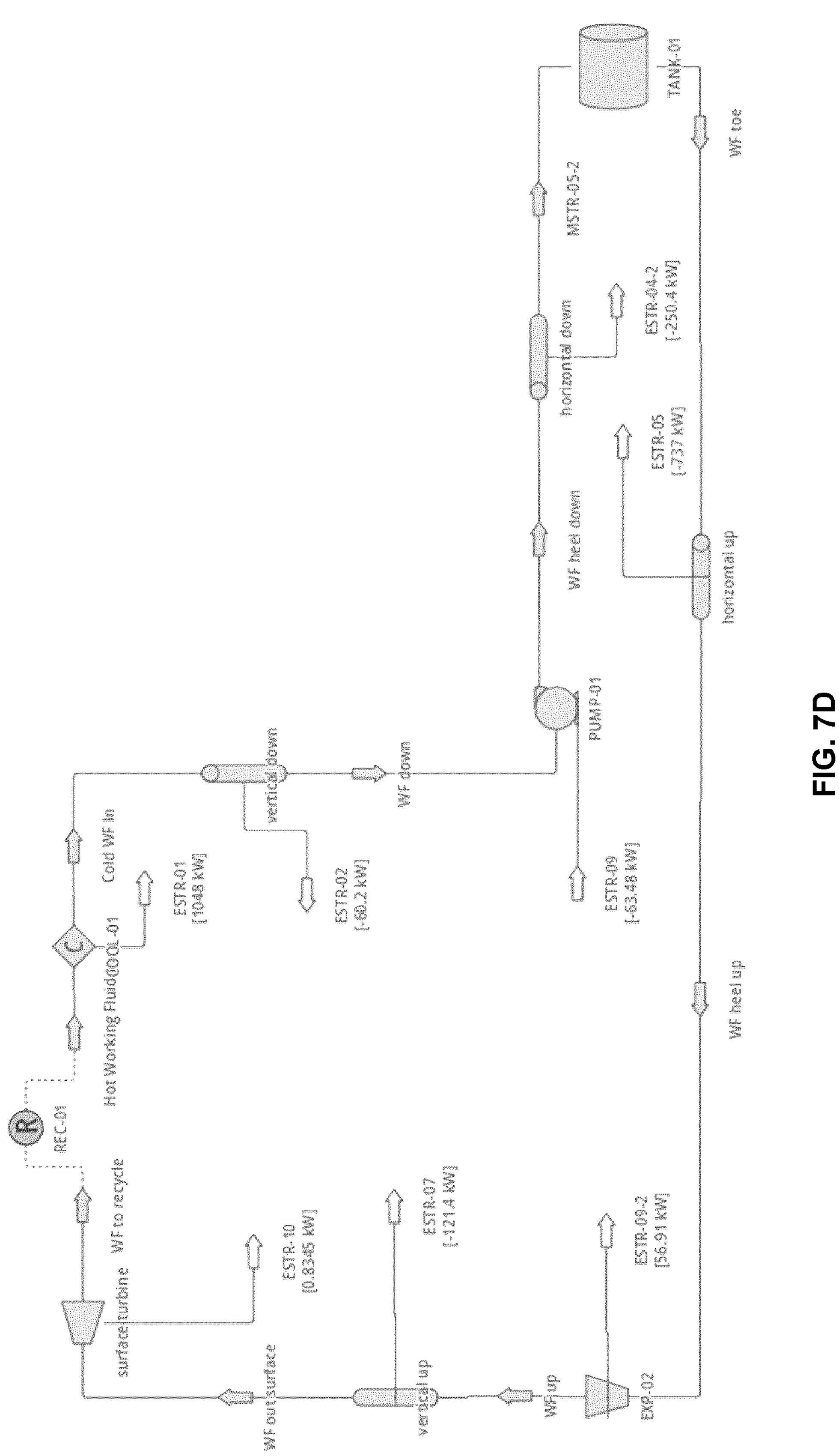

FIG. 7D illustrates the configuration of the system in a fourth simulation. The fourth simulation was performed on a system comprising a gas turbine located at the vertical return portion of the channel and a hydraulic turbine located at the vertical feed portion of the channel. The simulation results showed ~63 kW of power produced at the hydraulic turbine and ~57 kW of power produced at the gas turbine.

Figure 7E:
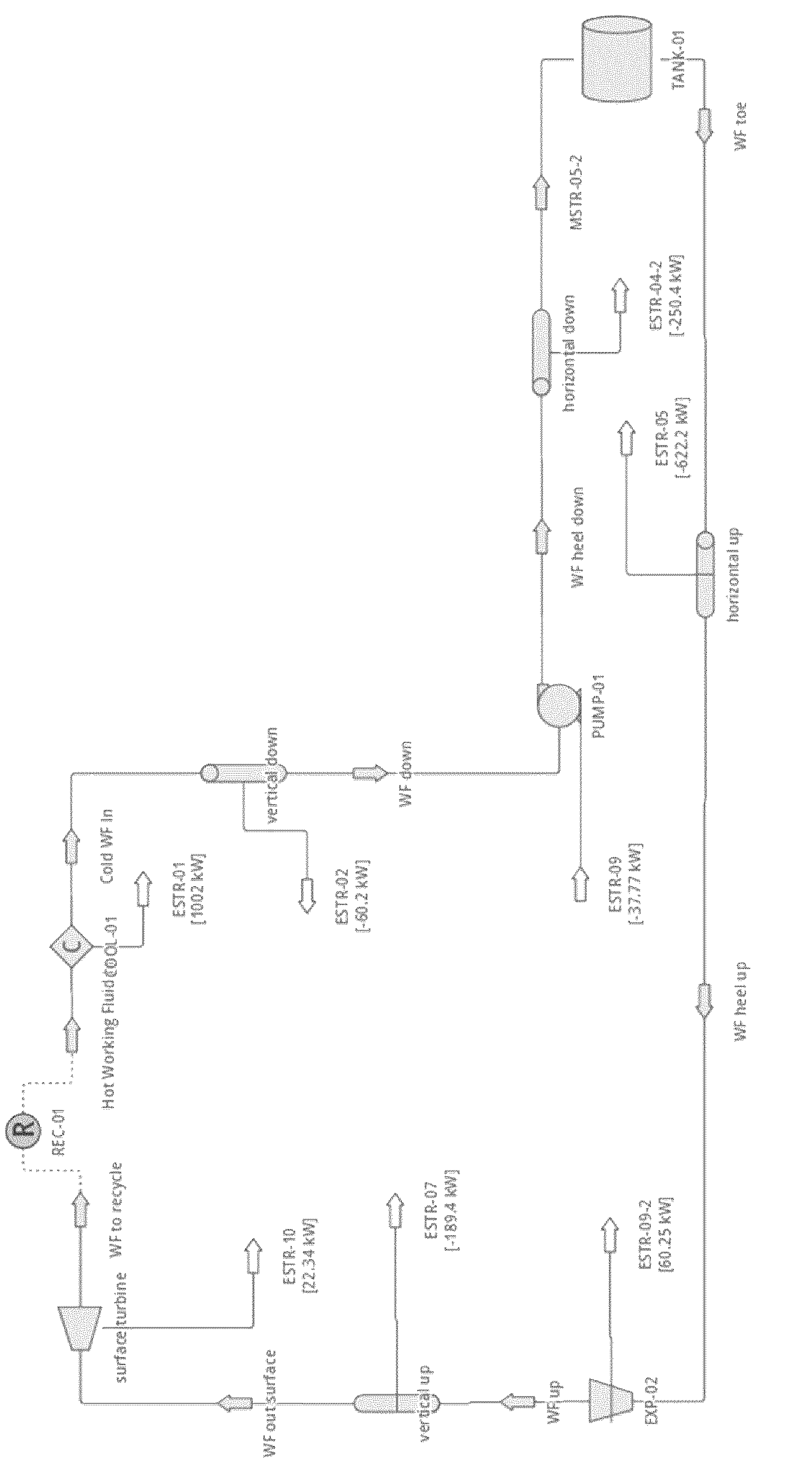

FIG. 7E illustrates the configuration of the system in a fifth simulation. The fifth simulation was performed on a system comprising a first gas turbine located at the surface, a second gas turbine located at the vertical return portion of the channel, and a hydraulic turbine located at the vertical feed portion of the channel. The simulation results showed ~38 kW of power produced at the hydraulic turbine, ~60 kW of power produced at the downhole gas turbine, and ~22 kW of power produced at the surface gas turbine.

The simulation results from the configurations shown in FIGS. 7A-7E suggest that the same heat pipe system produced more power with just the downhole turbine than just the surface turbine, and that multi-turbine configurations can help increase the total power output (e.g., see FIG. 7E).

Figure 7F:
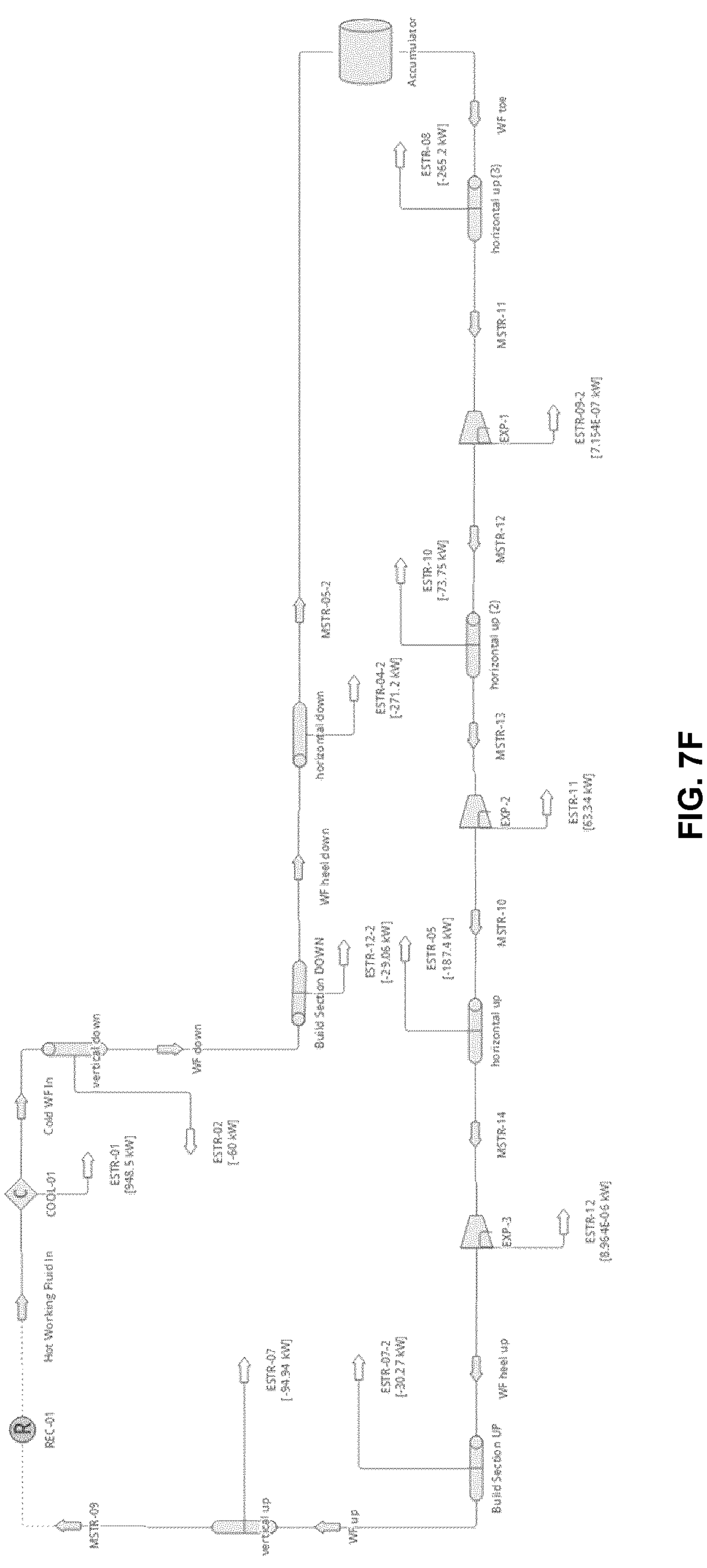

FIG. 7F illustrates the configuration of the system in a sixth simulation. The sixth simulation was performed on a system comprising a single turbine located at the horizontal return portion of the channel. The simulation results showed ~63 kW of power produced at the turbine for a 9 MPa pressure drop. The total heat transferred into the system downstream of "horizontal up (3)" is ~386 kW.

Figure 7G:
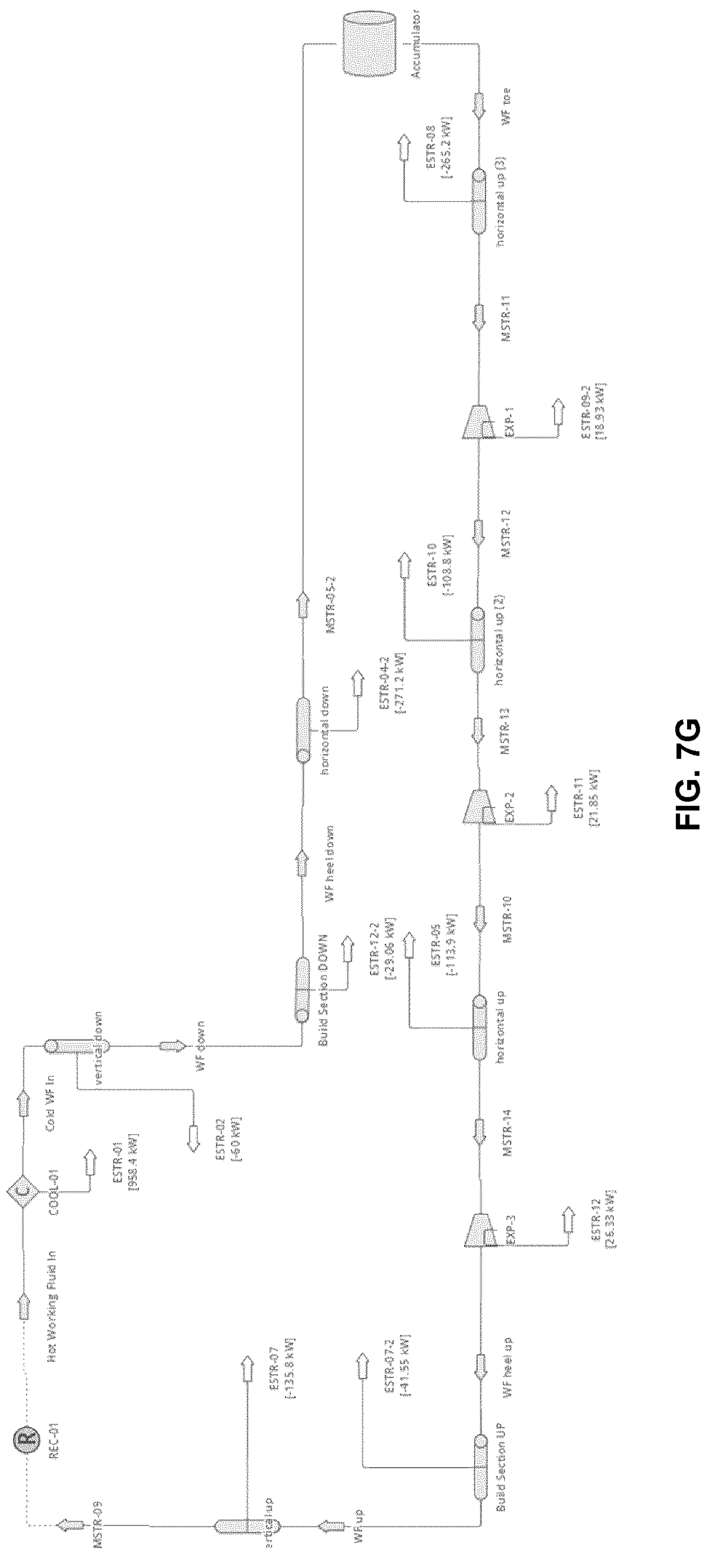

FIG. 7G illustrates the configuration of the system in a seventh simulation. The seventh simulation was performed on a system comprising three (3) gas turbines positioned in series at the horizontal return portion of the channel. The simulation results showed ~19 kW of power produced at the first turbine (i.e., the turbine closest to the toe), ~22 kW of power produced at the second turbine, and ~26 kW of power produced at the third turbine. The simulation result also showed the temperature of the working fluid rising to a temperature of ~70° C. before passing through the first turbine, ~76° C. before passing through the second turbine, and ~76° C. before passing through the third turbine for a total of ~67 kW. The pressure drop across each turbine is ~3 MPa, for a total pressure drop of ~9 MPa. The total heat transferred into the system downstream of "horizontal up (3)" is ~400 kW.

The simulation results from the configurations shown in FIGS. 7F and 7G show advantages of using multiple turbines to increase electrical power output for the same overall pressure drop. The simulation results also show an increased the amount of thermal energy than can be harvested from the same heat pipe system by using multiple turbines.

Example 3: Working Fluid Selection

In a third simulation study performed by the inventors, systems of the type described herein were modeled using software to assess the effects of fluid selection on the power output. In the simulation studies, cold working fluid was supplied to the channel of at a pressure of 4.5 MPa and a temperature of 9.87° C. The maximum downhole temperature in is set to between 60.5° C. and 61° C.

Figure 8A:
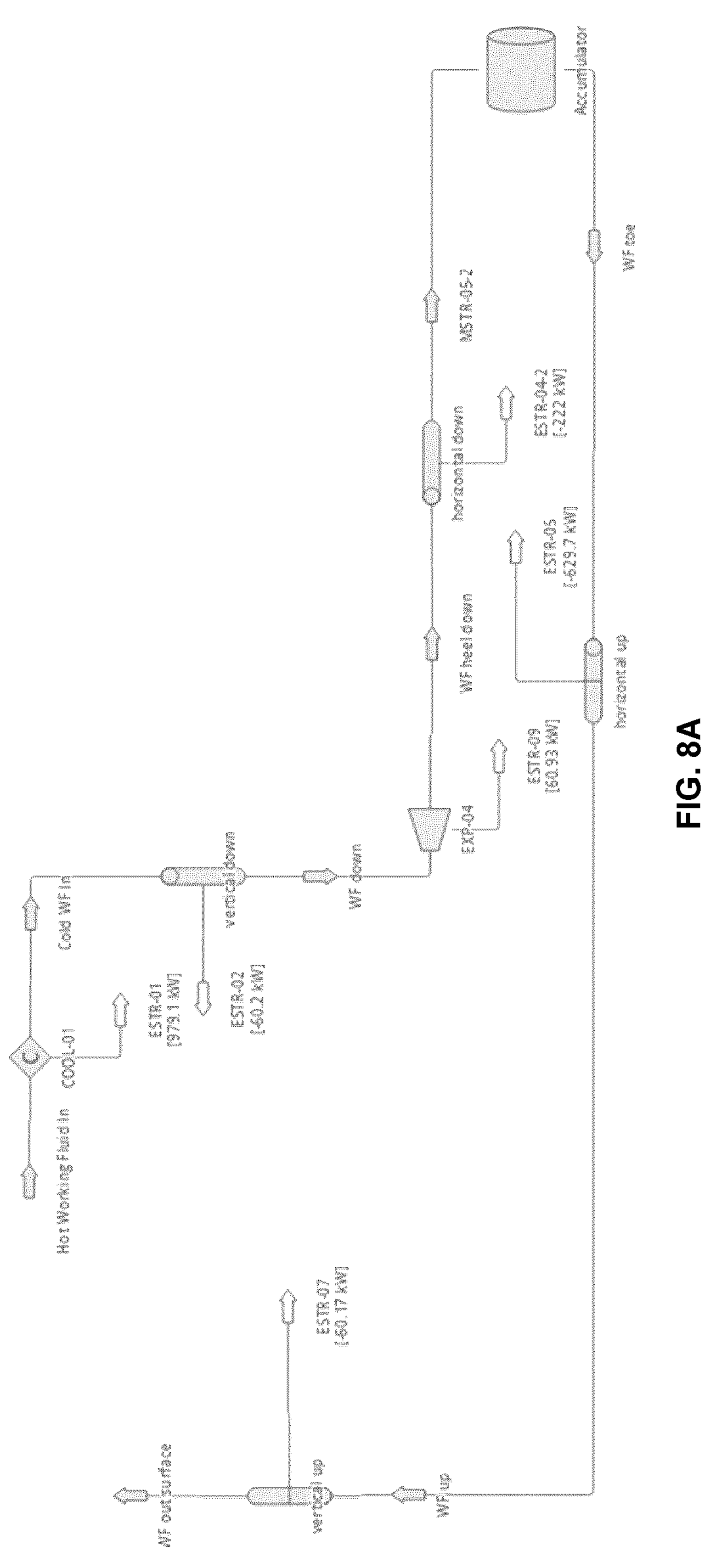
FIGS. 8A-8B depict various example configurations of a geothermal power system that were studied in a simulation experiment on the working fluid used in the system.

FIG. 8A illustrates the configuration of the system in a first simulation. The first simulation was performed on a system comprising a hydraulic turbine located at the vertical feed portion of the channel to produce ~61 kW. The simulation was performed using 1.0M $CO_2$ as the working fluid in a well having a maximum temperature of 60° C. The simulation results showed ~65 kW of power produced at the hydraulic turbine but the working fluid could not cycle in the system as the pressure at the top of the return portion was only 3.6 MPa.

Figure 8B:
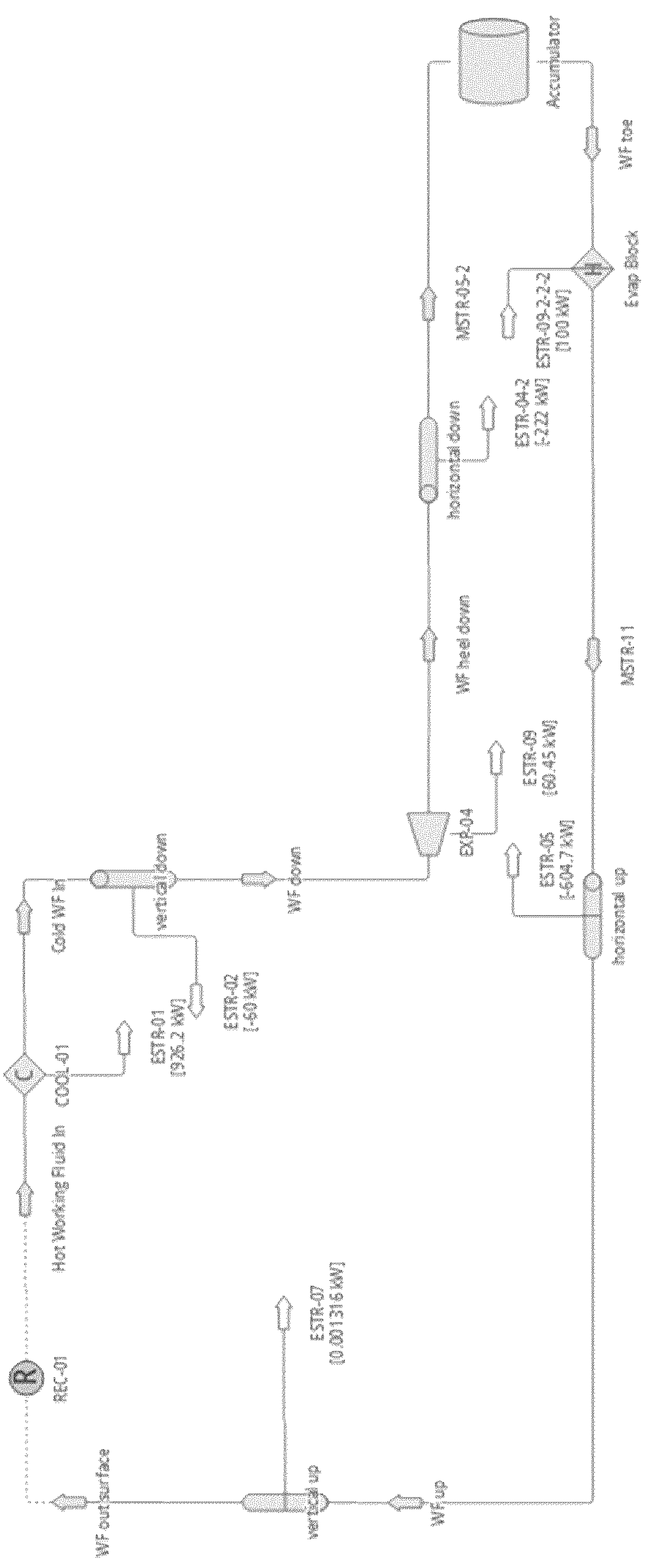

FIG. 8B illustrates the configuration of the system in a second simulation with nearly the same overall heat transfer into the system and the same power generated. The second simulation was performed on a hydraulic turbine located at the vertical feed portion of the channel to produce ~60 kW. The difference is that this simulation was performed using a mixture of 0.9M $CO_2$ and 0.1M ethane as the working fluid in a well having a maximum temperature of ~60° C. and the fluid was able to circulate to surface despite the lower downhole temperature.

Example 4: Ideal Enhanced Thermodynamic Cycle

Figure 9A:
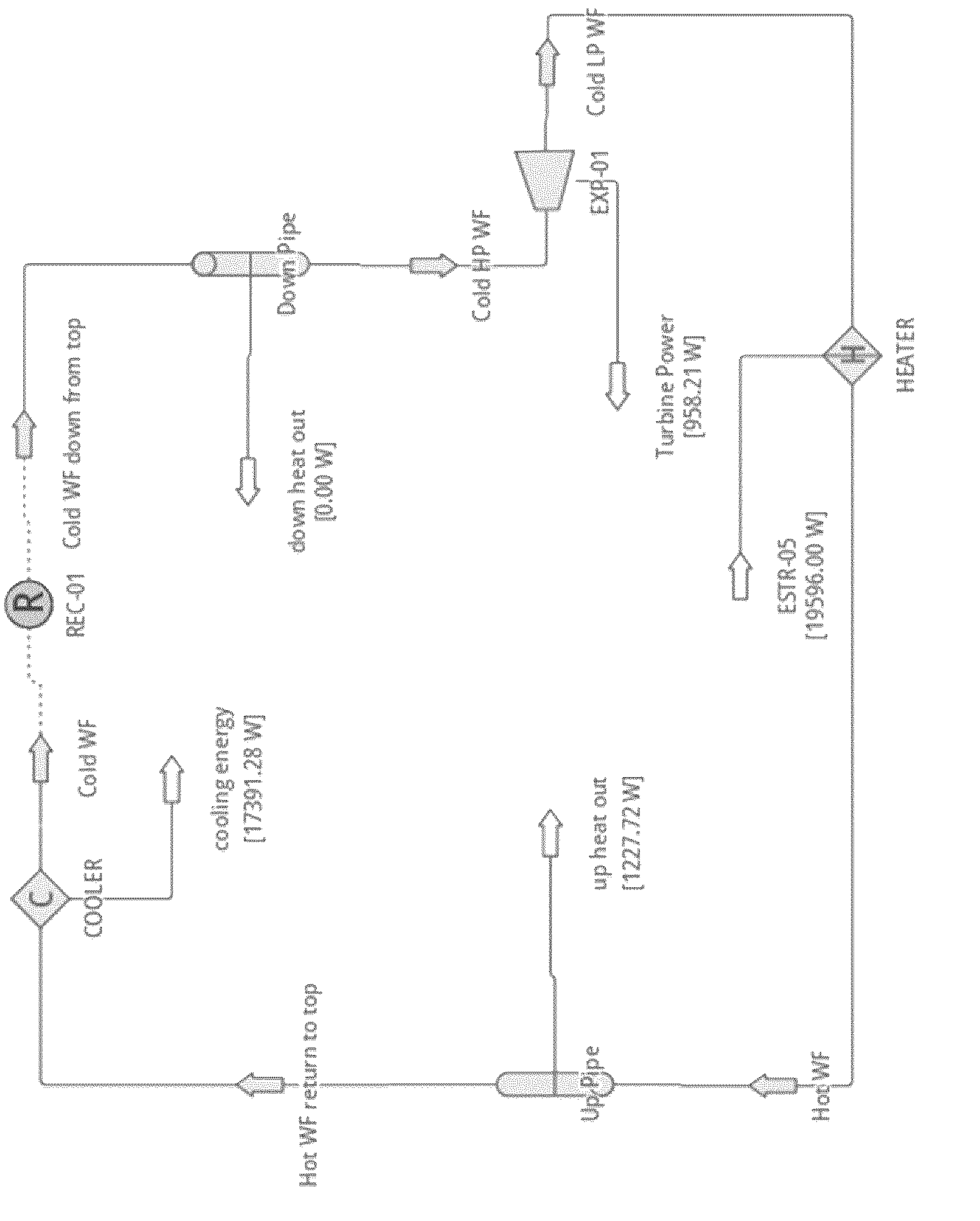
FIGS. 9A-9B depict various example configurations of a geothermal power system modeled based on the ideal system shown in FIG. 5A.

In a fourth simulation study performed by the inventors, systems of the type described in relation to FIG. 5A were modeled using software to assess power output. FIG. 9A shows the configuration of the simulated system. The simulated system has vertical separation varied between 5 to 1000 meters and uses R123 as the working fluid. The working fluid is set to a temperature of 20° C. and a pressure of 76 kPa at the surface. The flow rate is set to 0.1 kg/s, the inner diameter of the Down Pipe is set to 18 mm, and the inner diameter of the Up Pipe is set to 76 mm. The fluid evaporates in the Heater and condenses in the Cooler. The flowing table shows how the vertical separation between the Heater/Evaporator and the Cooler/Condenser. The results of the study is shown in Table 1 below.

TABLE 1

| Case | Vertical Sep. [m] | Heater [W] | Up Pipe [W] | Turbine Output [W] | Pressure after the Heater [kPA] | Temperature after the Heater [C.] | Pressure Drop across the Turbine [KPa] | Efficiency of the system | Carnot Efficiency | % Carnot Efficiency |
|---|---|---|---|---|---|---|---|---|---|---|
| 1 | 5 | 17032 | 5.8 | 4.8 | 76.6 | 20.35 | 71 | 0.03% | 0.1% | 76.4% |
| 2 | 50 | 17168 | 64 | 48 | 81 | 21.8 | 715 | 0.28% | 0.7% | 54.2% |
| 3 | 500 | 18415 | 616 | 481 | 137 | 34 | 7200 | 2.61% | 4.6% | 42.7% |
| 4 | 1000 | 19596 | 1228 | 958 | 183 | 45 | 14500 | 4.89% | 7.9% | 37.8% |

As can be seen Table 1, the system efficiency increases as the vertical separation between the heater and cooler increases. The thermal energy into the system is fairly constant through all four cases, but the turbine output increases as the vertical separation increases. The system approaches the maximum possible Carnot efficiency as the vertical separation approaches zero, but is able to attain a smaller percentage of the Carnot efficiency as the vertical separation increase. The overall system efficiency increases with depth and there is very little parasitic work required by the cycle, which is different from other types of cycles. Illustratively, cycles like the FIG. 5A cycle may result in a higher efficiency than other thermodynamic cycles for low enthalpy geothermal applications that are sufficiently deep.

Figure 9B:
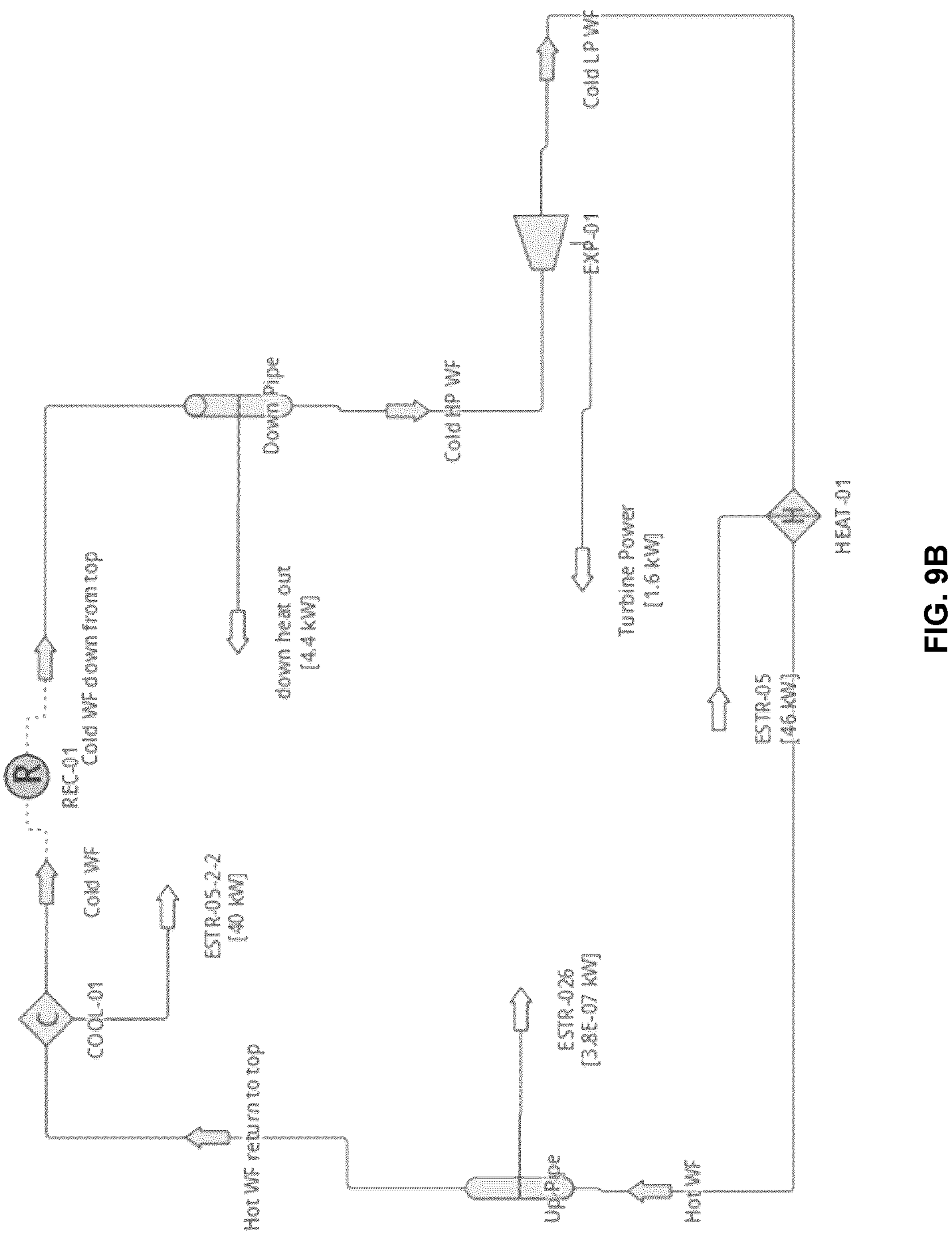

Referring now to FIG. 9B, the idealized process model can also be a modified Brayton cycle. In the simulation conducted using the setup shown in FIG. 9B, the working fluid is super critical $CO_2$ with a pressure of 13 MPa and temperature of 30° C. at the top of the cycle. The vertical separation between the Heater and the Cooler is 1500 meters. The flow rate is 0.75 kg/s, the inner diameter of the Down Pipe is 50 mm, the overall heat transfer coefficient is 8 $W/m^2K$, and the Geothermal Gradient is 30° C./km. The inner diameter of the Up Pipe is 155 mm, the overall heat transfer coefficient is 8 $W/m^2K$, and the Geothermal Gradient is 30° C./km. The temperature at the outlet of the heater is 60° C. The simulation results showed a power output of ~1.6 kW and the heat harvested at the bottom of the cycle to be 46 kW.

The examples used herein are for illustrative purposes only. The principles discussed herein with reference to apparatuses and methods for producing electricity using geothermal energy may be implemented in other systems and apparatuses. Different configurations and terminology can be used without departing from the principles expressed herein. For instance, steps, equipment, components, and modules can be added, deleted, modified, or re-arranged without departing from these principles.

Interpretation of Terms

Unless the context clearly requires otherwise, throughout the description and the claims: "comprise," "comprising," and the like are to be construed in an inclusive sense, as opposed to an exclusive or exhaustive sense; that is to say, in the sense of "including, but not limited to". "Connected," "coupled," or any variant thereof means any connection or coupling, either direct or indirect, between two or more elements; the coupling or connection between the elements can be physical, logical, or a combination thereof. "Herein," "above," "below," and words of similar import, when used to describe this specification shall refer to this specification as a whole and not to any particular portions of this specification. "Or" in reference to a list of two or more items, covers all of the following interpretations of the word: any of the items in the list, all of the items in the list, and any combination of the items in the list. The singular forms "a," "an," and "the" also include the meaning of any appropriate plural forms.

Where a component is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A geothermal power system comprising:

a channel configured for containing a working fluid and directing the working fluid at least in part through a wellbore, wherein the channel is a continuous channel which comprises a feed portion configured to allow the working fluid to flow in a direction away from a surface of the wellbore and a return portion configured to allow the working fluid to flow in a direction towards the surface, wherein the feed portion and the return portion each include downhole portions installed in the wellbore, wherein the channel is a closed loop and the working fluid harvests thermal energy from a formation surrounding the wellbore;

a downhole liquid turbine disposed in the feed portion and configured to operate within the wellbore being driven by the working fluid contained within the channel;

a downhole electrical generator disposed in one of the downhole portions and configured to operate within the wellbore and to be driven by the turbine to generate electricity; and an electrical cable for transmitting the electricity generated by the downhole electrical generator to the surface.

2. The geothermal power system of claim 1, wherein the downhole liquid turbine comprises an impulse turbine, a reaction turbine, or a Tesla turbine.

3. The geothermal power system of claim 1, wherein the downhole electrical generator is an axial flux generator.

4. The geothermal power system of claim 1, wherein the system comprises multiple turbines within the wellbore.

5. The geothermal power system of claim 4, wherein the system comprises multiple turbines and generators operating within a single thermal circuit to allow multiple reheat cycles between the turbine generator units.

6. The geothermal power system of claim 1, wherein the system is configured to be positioned in a horizontal well having a vertical section and a horizontal section, such that the downhole liquid turbine is configured to be positioned toward the bottom of the vertical section or in the horizontal section.

7. The geothermal power system of claim 1, wherein the system is configured to operate at a maximum downhole temperature of between 60° C. and 150° C.

8. The geothermal power system of claim 1, wherein the geothermal power system comprises two turbines positioned at the same overall measured depth in opposing channels connected to a single generator.

9. The geothermal power system of claim 1, wherein the feed portion is thermally insulated from the return portion such that feed flow does not begin to vaporize until after the downhole liquid turbine.

10. The geothermal power system of claim 1, wherein a cross-sectional area of the return portion is greater than a cross-sectional area of the feed portion.

11. The geothermal power system of claim 1, wherein the wellbore is within a depleted oil and gas formation and wherein the wellbore is resealed to prevent fluid and pressure communication between the wellbore and formation.

12. The geothermal power system of claim 1, wherein the feed portion is thermally insulated from the return portion up to 400 m before and after a location of the downhole liquid turbine.

13. The geothermal power system of claim 1 further comprising a check valve in the feed portion or where the feed portion connects to the return portion to ensure that the working fluid flows towards the return portion.

14. A method of generating electricity using the system of claim 1, the method comprising:

directing the working fluid through the channel;

while the working fluid remains in a liquid phase, passing the working fluid through the downhole liquid turbine;

after passing the working fluid through the downhole liquid turbine, directing the working fluid toward and into the return portion, the working fluid transitioning to a gas phase after the downhole liquid turbine;

driving a downhole electrical generator from the downhole liquid turbine to generate electricity; and transmitting the electricity to the surface.

* * * * *